(12) United States Patent
Adam et al.

(10) Patent No.: US 11,330,757 B2
(45) Date of Patent: May 17, 2022

(54) SOIL-DISTURBING APPARATUS

(71) Applicant: Far West Supply, LLC, Santa Maria, CA (US)

(72) Inventors: Kieran L. Adam, Nipomo, CA (US); Dominic L. Adam, Santa Maria, CA (US)

(73) Assignee: Far West Supply, LLC, Santa Maria, CA (US)

( * ) Notice: Subject to any disclaimer, the term of this patent is extended or adjusted under 35 U.S.C. 154(b) by 140 days.

(21) Appl. No.: 16/905,794

(22) Filed: Jun. 18, 2020

(65) Prior Publication Data

US 2021/0392808 A1 Dec. 23, 2021

(51) Int. Cl.
*A01B 79/00* (2006.01)
*A01B 39/18* (2006.01)
*A01B 39/10* (2006.01)

(52) U.S. Cl.
CPC ............ *A01B 79/005* (2013.01); *A01B 39/10* (2013.01); *A01B 39/18* (2013.01)

(58) Field of Classification Search
CPC ........ A01B 39/10; A01B 39/18; A01B 79/005
See application file for complete search history.

(56) References Cited

U.S. PATENT DOCUMENTS

| | | | | |
|---|---|---|---|---|
| 1,479,188 A | * | 1/1924 | Larson ................... | A01B 11/00 172/54 |
| 1,655,044 A | * | 1/1928 | Bolens ................... | A01B 39/10 172/57 |
| 1,816,890 A | * | 8/1931 | Booth .................... | A01B 39/10 172/84 |
| 2,613,582 A | * | 10/1952 | Harshberger .......... | A01B 39/10 172/40 |
| 3,057,412 A | * | 10/1962 | Hovis, Jr. .............. | A01B 39/10 172/42 |
| 3,710,870 A | * | 1/1973 | Pfeiffer .................. | A01B 1/065 172/40 |
| 4,811,794 A | * | 3/1989 | Greene .................. | A01B 11/00 172/43 |
| 2020/0236833 A1 | * | 7/2020 | Kremmer ............... | A01B 63/10 |

FOREIGN PATENT DOCUMENTS

| | | | | |
|---|---|---|---|---|
| DE | 102017113726 A1 | * | 12/2018 | ............... G06T 7/90 |
| EP | 3571913 A1 | * | 11/2019 | ........... A01C 21/005 |

\* cited by examiner

*Primary Examiner* — Jessica H Lutz

(74) *Attorney, Agent, or Firm* — Fitch, Even, Tabin & Flannery LLP

(57) ABSTRACT

Systems and methods for disturbing soil are described. The systems may include an elliptical motion mechanism, a shaft coupled to the elliptical motion mechanism, wherein the elliptical motion mechanism is configured to move the shaft in an elliptical path, and a hoe blade coupled to the shaft such that the hoe blade in an initial position is proximate to a soil surface, and wherein a face of the hoe blade is located in a plane intersecting the plane of the elliptical path, and wherein the soil-disturbing apparatus is configured to receive a signal to operate the elliptical motion mechanism, and in response to receiving the signal, operate the elliptical motion mechanism so the hoe blade is moved in an elliptical path, and whereby a portion of the hoe blade elliptical path falls below the soil surface to disturb the soil.

16 Claims, 24 Drawing Sheets

SOIL-DISTURBING APPARATUS

BACKGROUND OF THE INVENTION

1. Field of the Invention

The present invention relates generally to agriculture, and more specifically to soil disturbing.

2. Discussion of the Related Art

Various systems and processes are known in the art for disturbing soil. Soil disturbing may include breakup up and turning over soil. This may be done to mix amendments into the soil, or to soften the soil (e.g., to enable roots to penetrate more easily into the soil.) Disturbing soil may also remove weeds or mix organic material into the soil.

However, in some cases, soil disturbing may be inefficient and time consuming. Furthermore, conventional soil disturbing methods may disturb too much, or too little of the soil. Therefore, there is a need in the art for improved systems and methods for disturbing soil.

SUMMARY

An apparatus for soil disturbing is described. Embodiments of the apparatus may include an elliptical motion mechanism, a shaft having a first end and a second end, wherein the first end is coupled to the elliptical motion mechanism and the second end is distal to the elliptical motion mechanism, wherein the elliptical motion mechanism is configured to move the second end in an elliptical path, and a hoe blade coupled to the second end of the shaft such that the hoe blade in an initial position is proximate to a soil surface, and wherein a face of the hoe blade is located in a plane intersecting with the plane of the elliptical path, wherein the soil-disturbing apparatus is configured to receive a signal to operate the elliptical motion mechanism, and, in response to receiving the signal, operate the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed.

A method for soil disturbing is described. Embodiments of the method may traverse a field by a soil-disturbing apparatus including an elliptical motion mechanism, receive, while traversing, a signal to operate the elliptical motion mechanism including a hoe blade and configured to rotate the hoe blade in an elliptical path, wherein the hoe blade is located such that a portion of the path falls below a surface of the soil, operate, in response to receiving the signal, the elliptical motion mechanism, whereby the portion of the hoe blade elliptical path falls below the soil surface, whereby soil in the path of the hoe blade is disturbed, and operate, in response to receiving the signal, the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed.

DETAILED DESCRIPTION

The present disclosure describes systems and methods for automatically disturbing soil.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
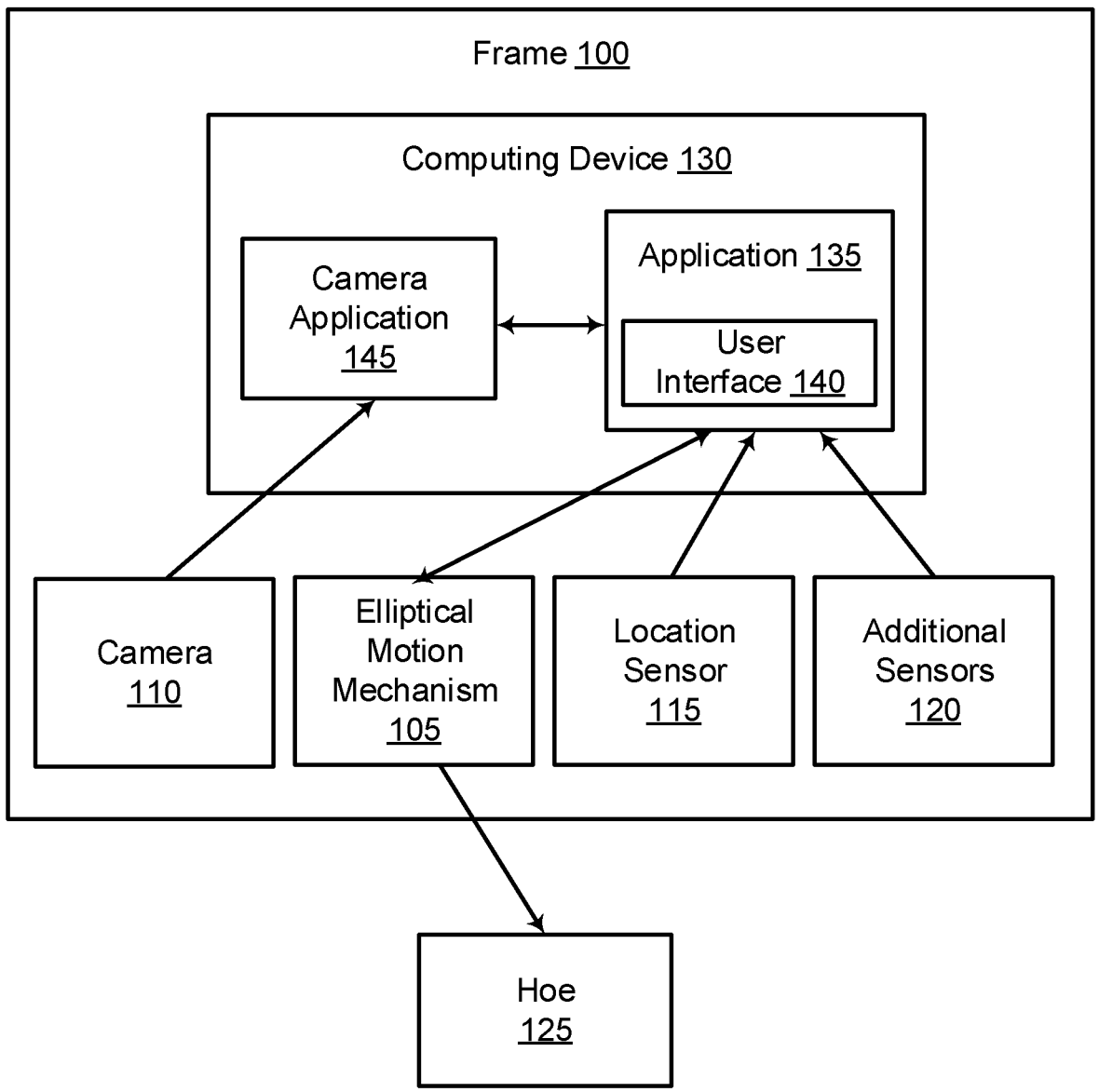
FIG. 1 shows an example of a soil disturbing apparatus according to aspects of the present disclosure.

FIG. 1 shows an example of a soil disturbing apparatus according to aspects of the present disclosure. The example shown includes frame 100, hoe 125, and computing device 130.

Referring first to FIG. 1, a schematic diagram of a soil-disturbing apparatus is shown. In the present embodiment of the invention, the soil-disturbing action taken by the soil-disturbing apparatus is a hoeing action. An elliptical hoe device is mounted to a frame 100 configured to traverse a field. The elliptical hoe device comprises a hoe blade coupled to an elliptical motion mechanism 105 via a hoe shaft. The hoe blade is oriented such that when the hoe blade is proximate to the ground the hoe shaft extends generally upwards and is coupled to the elliptical motion mechanism 105. An exemplary embodiment of the elliptical hoe device is described further with respect to FIGS. 3-6.

When the elliptical motion mechanism 105 is activated, it causes the blade of the hoe 125 to move in an elliptical path. The elliptical motion mechanism 105 may be activated such that the blade moves in a complete elliptical motion, or the elliptical motion mechanism 105 may move in a portion of an ellipse. The elliptical motion mechanism 105 may be activated to move in one direction along the elliptical path, then reverse the elliptical motion to return to the starting location. The elliptical motion of the hoe blade is at a speed and orientation such that it results in a top portion of the soil in the field being disturbed.

In some embodiments the elliptical motion of the hoe blade through the soil results in a plant being uprooted and removed from the field. In some embodiments the speed of the hoe blade is under 300 rpm. In other embodiments the speed of the hoe blade depends at least in part on the forward speed of the tractor. In other embodiments the speed of the hoe blade depends at least in part on the time delays of elections. In other embodiments the speed of the hoe blade depends at least in part on the desired magnitude of impact of the hoe blade with the soil. In other embodiments the speed of the hoe blade depends at least in part on a desired trajectory of soil dislodged by the hoe blade.

The elliptical motion mechanism 105 is coupled to computing device 130 such as a programmable logic controller (PLC) running a hoeing application 135 such that the activation of the elliptical motion mechanism 105 is operatively controlled by the hoeing application 135. In some embodiments, a user interface 140 is coupled to the hoeing application 135 such that a user may change parameters of operation of the apparatus, view real-time data while the apparatus is being operated, or view data for previous operation of the soil-disturbing/hoeing apparatus. In other embodiments, the user interface 140 comprises a power and/or reset button.

A digital camera 110 is operatively controlled by the PLC/hoeing application 135. A camera application 145 is coupled to the digital camera 110 and the hoeing application 135. The camera application 145 may be run on the PLC or on a separate processor. In another embodiment the camera application 145 is included in the camera 110 instead of being included in the computing device 130. The hoeing application 135 sends indications to the digital camera 110. Upon receiving each indication, the camera 110 takes a photo and sends the photo to the camera application 145 for processing. The camera 110 may take photographs at certain intervals of time, at intervals of distance, at times based on received data, or any combinations thereof. The camera may take photographs 110 at times determined based on other received or stored data. The time intervals may be constant or variable. The photo times may be determined by the hoeing application 135 using an algorithm.

A location/distance sensor 115 is communicatively coupled to the hoeing application 135. The hoeing application 135 receives data sent from the location/distance sensor, in some embodiments via an encoder, and may use the data to determine operational parameters of the soil-disturbing/hoeing apparatus.

In some embodiments, one or more additional data collectors and/or sensors are coupled to the frame 100 and in communication with the PLC/hoeing application 135. The hoeing application 135 receives data sent from the data collector, in some embodiments via an encoder, and may use it to determine operational parameters of the soil-disturbing-hoeing apparatus. In one example, a proximity/ground sensor may be used to tell if the sled is raised so that it is not contacting the ground (the sled is raised, for example, when the apparatus is being transported from one field to another).

The elliptical motion mechanism 105 includes a motor, which when activated engages a mechanism. The mechanism is coupled to the hoe blade via the hoe shaft, whereby the hoe blade moves in an elliptical path. The elliptical hoeing device may be powered by any suitable power source. In one embodiment, a hydraulic motor is coupled to and powered by hydraulic power generated by the vehicle pulling the frame 100. Electrical elements may be powered by the vehicle or by a generator.

Frame 100 may be coupled to the elliptical motion mechanism 105. In some examples, the frame 100 is configured to traverse a field having the soil surface. Frame 100 may traverse a field along with a soil-disturbing apparatus including an elliptical motion mechanism 105.

Frame 100 may be an example of, or include aspects of, the corresponding element or elements described with reference to FIGS. 5, 9-15, and 21. Frame 100 may include elliptical motion mechanism 105, camera 110, location sensor 115, and additional sensors 120.

Elliptical motion mechanism 105 may cause the hoe 125 to follow an elliptical path. In some examples, the second end elliptical path is located in a plane within 5 degrees of vertical. In some examples, the apparatus is further configured to return the hoe blade to the initial position after disturbing the soil. In some examples, the returning to the initial position is achieved by the elliptical motion mechanism 105 moving the hoe blade through the complete elliptical path. In some examples, the angle between a semi-major axis of the elliptical path and vertical is less than 45 degrees. In some examples, the angle between a semi-minor axis of the elliptical path and vertical is less than 45 degrees.

Elliptical motion mechanism 105 may be an example of, or include aspects of, the corresponding element or elements described with reference to FIG. 5.

Camera 110 may take a photograph of a region of the field that will subsequently be within the path of the hoe 125 prior to sending the signal. Camera 110 may also repeat the step of taking a photograph of a region of the field.

Camera 110, location sensor 115, and hoe 125 may be examples of, or include aspects of, the corresponding elements described with reference to FIG. 5.

Computing device 130 may include application 135 and camera application 145. Application 135 may run on a computing device 130, wherein the application 135 is in operatively coupled to the camera 110 and the elliptical motion mechanism 105, wherein the soil-disturbing apparatus is further configured to traverse the field; while traversing the field, take a photograph of a region of the field that will subsequently be within the path of the hoe 125; determine whether at least one plant is identified in the photograph; in response to determining that at least one plant is identified in the photograph, determine, for each plant, whether the plant will be within range of the elliptical path of the hoe blade as the apparatus traverses the field; in response to determining that at least one plant will be within range of the elliptical path, for each plant determine whether soil-disturbing action is to be taken with respect to the plant; in response to determining that hoeing action is to be taken with respect to at least one plant, for each plant for which hoeing action is to be taken, determine at least one time when the hoeing action is to be taken based at least in part on the plant location;

and, at the at least one determined time, activate the elliptical motion mechanism 105.

In some examples, the soil-disturbing action includes activating the elliptical motion mechanism 105 when a leading edge of the hoe blade is adjacent to the plant, and activating the elliptical motion mechanism 105 again when a trailing edge of the hoe blade has passed the location of the plant, whereby the soil before and after the plant is cleared. In some examples, the soil-disturbing action includes activating the elliptical motion mechanism 105 when the hoe blade is at the plant location, whereby the plant is removed from the soil by the action. In some examples, the determining whether soil-disturbing action is to be taken with respect to the plant further includes determining viability of the plant.

Application 135 may receive, while traversing, a signal to operate the elliptical motion mechanism 105 including a hoe blade and configured to rotate the hoe blade in an elliptical path, where the hoe blade is located such that a portion of the path falls below a surface of the soil. Application 135 may also operate, in response to receiving the signal, the elliptical motion mechanism 105, whereby the portion of the hoe blade elliptical path falls below the soil surface, whereby soil in the path of the hoe blade is disturbed.

Application 135 may also operate, in response to receiving the signal, the elliptical motion mechanism 105, whereby the hoe blade is moved in an elliptical path congruent to the elliptical path of the second end, whereby a portion of the hoe blade elliptical path falls below the soil surface, whereby soil in the path of the hoe blade is disturbed. Application 135 may also determine whether at least one plant is identified in the photograph.

Application 135 may also determine, for each plant, whether the plant will be within range of the elliptical path of the hoe blade as the apparatus is traversing the field, in response to determining that at least one plant is identified in the photograph. Application 135 may also determine, for each plant, whether soil-disturbing action is to be taken with respect to the plant, in response to determining that at least one plant will be within range of the elliptical path.

Application 135 may also determine, for each plant for which hoeing action is to be taken, at least one time when the hoeing action is to be taken based on the plant location, in response to determining that hoeing action is to be taken with respect to at least one plant. Application 135 may also send the signal to operate the elliptical motion mechanism 105 at each of the at least one determined time.

In some examples, the determining whether soil-disturbing action is to be taken with respect to the plant includes determining whether the plant is wanted or viable. Application 135 may also return a programming flag value (i.e. a preset value, which, when returned, indicates to the application 135 that a particular state exists) when no plants are identified in the photograph. In some examples, the hoeing action is configured to disturb soil before and after each plant while leaving that plant undisturbed. In some examples, the hoeing action is configured to disturb the soil where each plant is rooted, thereby removing each plant from the field.

Application 135 may include user interface 140. For example, the user interface may include a display. A display may comprise a conventional monitor, a monitor coupled with an integrated display, an integrated display (e.g., an LCD display), or other means for viewing associated data or processing information.

In some cases, computing device 130 may include a processor for operating application 135. A processor may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, a processor may include special purpose components for modem processing, baseband processing, digital signal processing, or transmission processing.

In some cases, computing device may include a memory for storing elements of application 135. A computer memory may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Elliptical motion mechanism 105 may incorporate Artificial Intelligence to determine operation of one or more aspects of the elliptical motion mechanism 105. For example, Artificial Intelligence may be used to determine when photographs are taken and/or when the hoe 125 is activated.

Figure 2:
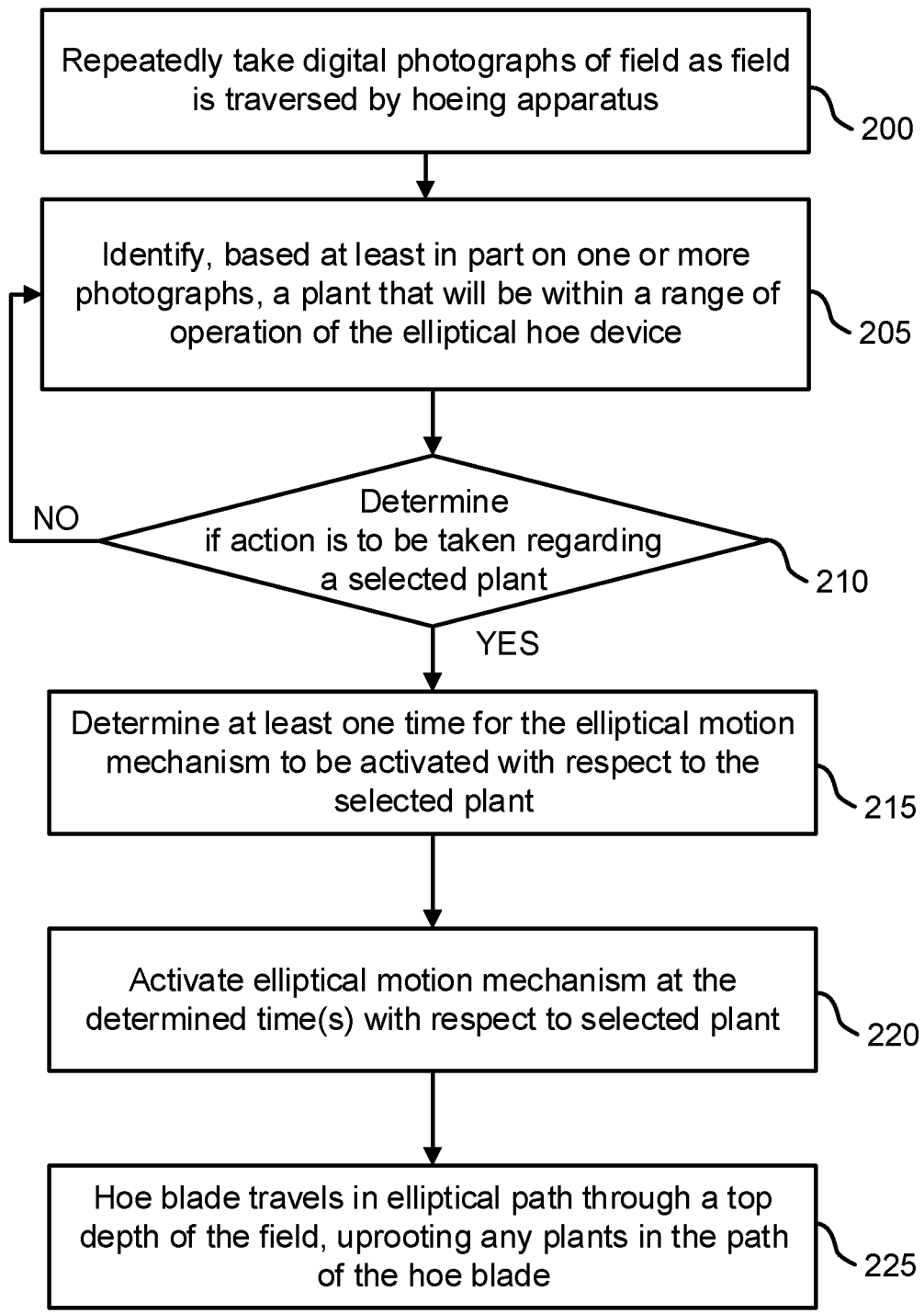
FIGS. 2 through 4 show examples of a process for disturbing soil according to aspects of the present disclosure.

FIG. 2 shows an example of a process for disturbing soil according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

Referring to FIG. 2, a method for hoeing with the soil-disturbing/hoeing apparatus is shown.

In the first step, while the soil-disturbing/hoeing apparatus traverses the field, camera repeatedly takes digital photographs of the field. The camera lens is positioned and oriented such that digital photographs include photographing of a field region that will subsequently be within range of the elliptical path of the hoe as the soil-disturbing/hoeing apparatus traverses the field. In one embodiments, such as is shown in FIG. 5, the camera and soil-disturbing/hoeing apparatus are aligned in the direction of travel such that if the soil-disturbing/hoeing apparatus is traveling in a straight line and the camera is facing downwards the camera will take a photo of the field surface directly below the camera and as the soil-disturbing/hoeing apparatus travels forward the same field surface will subsequently be in range of the elliptical path of the hoe.

In the next step, the digital photographs are sent from the camera to the camera application. The camera application analyzes one or more photographs to identify a plant or plants in the photographs that will be within range of the elliptical path of the hoe. For each identified plant, the camera application analyses the plant characteristics and determines if a hoeing action is to be taken regarding each plant. Plant criteria for determining elliptical hoe device action may include one or more of size, color, and spacing between plants. In one embodiment, based at least in part on measured plant criteria, the plant application designated plants as wanted, and action is taken in response to a plant designated as wanted. In another embodiment, action is taken in response to a plant designated as unwanted. In another embodiment, action is taken in response to a plant designated as a weed. In another embodiment, the plant application designates plants as wanted, and action is taken in response to a plant designated as wanted. In another embodiment, the plant application designated plants as unwanted, and action is taken in response to a plant designated as unwanted. It will be understood that multiple criteria may be applied simultaneously to determine whether action is taken.

In the next step, at least plant location information is sent from the camera application to the hoeing application for the selected plant or plants for which hoeing action is to be taken. Additional sensor information may also be sent to the hoeing application. The hoeing application then, using the location information and/or other received data, determines when the hoeing device will be activated so to provide the desired hoeing result with respect to the selected plant. In the preferred embodiment, the hoeing application activates the elliptical hoeing device before and after the plant to remove any plants next to the selected plant. In one example, the hoeing application activates the elliptical motion mechanism in a first motion when the leading edge of the hoe blade is before the selected plant and a second motion when the trailing edge of the hoe has passed the location of the selected plant. In some embodiments the second motion is determined by a distance passed after the first motion. In other embodiments the selected plant is to be removed and the elliptical hoe device is activated at the time to remove the selected plant.

In the next step, upon activation by the soil-disturbing/hoeing apparatus the elliptical hoeing mechanism causes the hoe blade to travel in an elliptical path through a top depth of the soil of the field, i.e. the hoe blade travels in an elliptical motion through the soil. The motion of the hoe blade is described further below. Finally, as the hoe blade travels through the soil, the hoe blade contacts the portion of a plant rooted in the soil.

As the hoe blade travels through the soil along the elliptical path, it contacts the plant. In some instances, the hoe blade pushes the plant through the soil, ultimately uprooting and ejecting the plant from the soil. In other instances, a top portion of the plant is cut off by the hoe blade. The action taken may depend on the extent of the plant, the characteristics of the soil, or other environmental variables, or the elliptical path may be designed to merely cut off the top of the plant as opposed to uproot and remove the entire plant from the soil.

Thus, at operation 200, the system repeatedly takes digital photographs of field as field is traversed by hoeing apparatus. In some cases, the operations of this step may refer to, or be performed by, a camera as described with reference to FIGS. 1 and 5.

At operation 205, the system identifies, based on one or more photographs, a plant that will be within a range of operation of the elliptical hoe device. In some cases, the operations of this step may refer to, or be performed by, an application as described with reference to FIG. 1.

At operation 210, the system determines if action is to be taken regarding selected plant. In some cases, the operations of this step may refer to, or be performed by, an application as described with reference to FIG. 1.

At operation 215, the system determines at least one time for the elliptical motion mechanism to be activated with respect to the selected plant. In some cases, the operations of this step may refer to, or be performed by, an application as described with reference to FIG. 1.

At operation 220, the system activates elliptical motion mechanism at the determined time(s) with respect to selected plant. In some cases, the operations of this step may refer to, or be performed by, an application as described with reference to FIG. 1.

At operation 225, the system causes the hoe blade to travel in elliptical path through a top depth of the field, uprooting any plants in the path of the hoe blade. In some cases, the operations of this step may refer to, or be performed by, an elliptical motion mechanism as described with reference to FIGS. 1 and 5.

Figure 3:
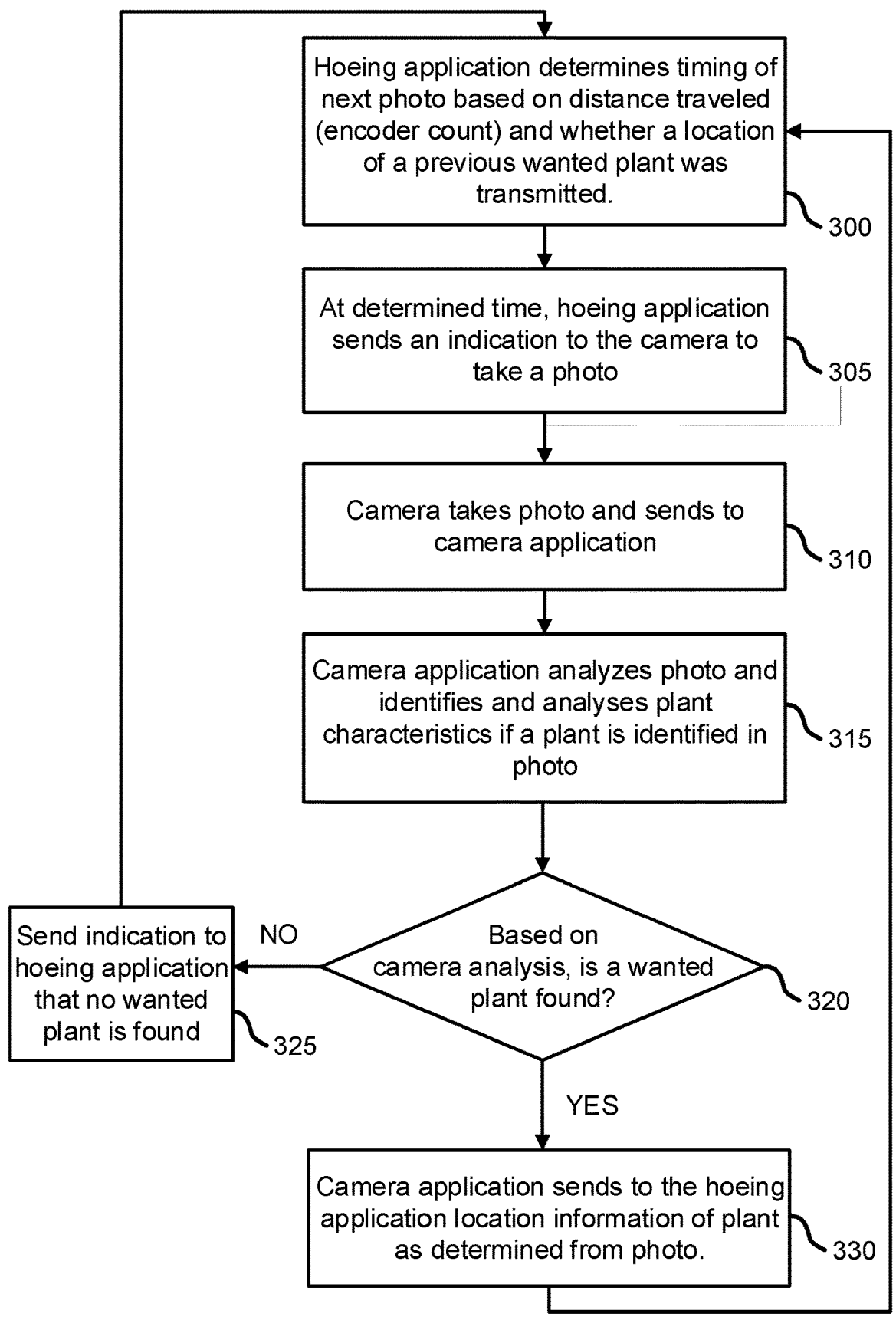

FIG. 3 shows an example of a process for disturbing soil according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

Referring to FIG. 3, an exemplary method for plant photography and analysis is shown. As previously described the hoeing application repeatedly takes digital photos as it traverses the field. The method of FIG. 3 describes the method for determining when to take a photo during traversing and the analysis of the photo.

In the first step, as the soil-disturbing/hoeing apparatus is traversing the field the hoeing application determines timing of the next photo based on a distance traveled by the soil-disturbing/hoeing apparatus (based on data received from the location/distance sensor) and whether a location of a previous wanted plant was previously received by the hoeing application. In the next step, at the determined time the hoeing application sends an indication to the camera to take a photo.

Next, the camera takes the photo of the field and send the photo to the camera application.

After receiving the photo, the camera application analyses the photo to identify if the photo includes a plant and, if a plant is identified, determine location data and plant characteristics of the plant based on the photo.

In the next decision point, if a plant is identified, the camera application determines if the plant is wanted. If the plant is unwanted the camera application sends an indication to the hoeing application that no wanted plant is found in the photo. In the current embodiment, when no wanted plant is found, the indication is a programming flag value in place of a coordinate location. In response to receiving the programming flag value, the hoeing application sends a signal to the camera application to take another photo. In some embodiments, in response to receiving a programming flag value the signal to the camera includes an instruction to take photos at a closer spacing than the previously set spacing. The method then returns to the first step.

If the plant is found to be wanted, the method proceeds to the next step and the camera application sends the location information (and any other requested plant data) to the hoeing application. The method then returns to the first step, the hoeing application determines the time of the next photo, and the process repeats.

Thus, at operation 300, the system determines the timing of a next photo based on distance traveled (encoder count) and whether a location of a previous wanted plant was transmitted. In some cases, the operations of this step may refer to, or be performed by, an application as described with reference to FIG. 1.

At operation 305, the system sends an indication to the camera to take a photo at the determined time. In some cases, the operations of this step may refer to, or be performed by, an application as described with reference to FIG. 1.

At operation 310, the system takes a photo and sends to camera application. In some cases, the operations of this step may refer to, or be performed by, a camera as described with reference to FIGS. 1 and 5.

At operation 315, the system analyzes the photo and identifies and analyses plant characteristics if a plant is identified in photo. In some cases, the operations of this step may refer to, or be performed by, a camera application as described with reference to FIG. 1.

At operation 320, the system determines whether a wanted plant is found based on the analysis. In some cases, the operations of this step may refer to, or be performed by, a camera application as described with reference to FIG. 1. In some cases, the operations of this step may refer to, or be performed by, a camera application as described with reference to FIG. 1.

At operation 325, the system sends indication to hoeing application that no wanted plant is found. In some cases, the operations of this step may refer to, or be performed by, a camera application as described with reference to FIG. 1.

At operation 330, the system sends location information of the plant as determined from photo, to the hoeing application location information. In some cases, the operations of this step may refer to, or be performed by, a camera application as described with reference to FIG. 1.

Figure 4:
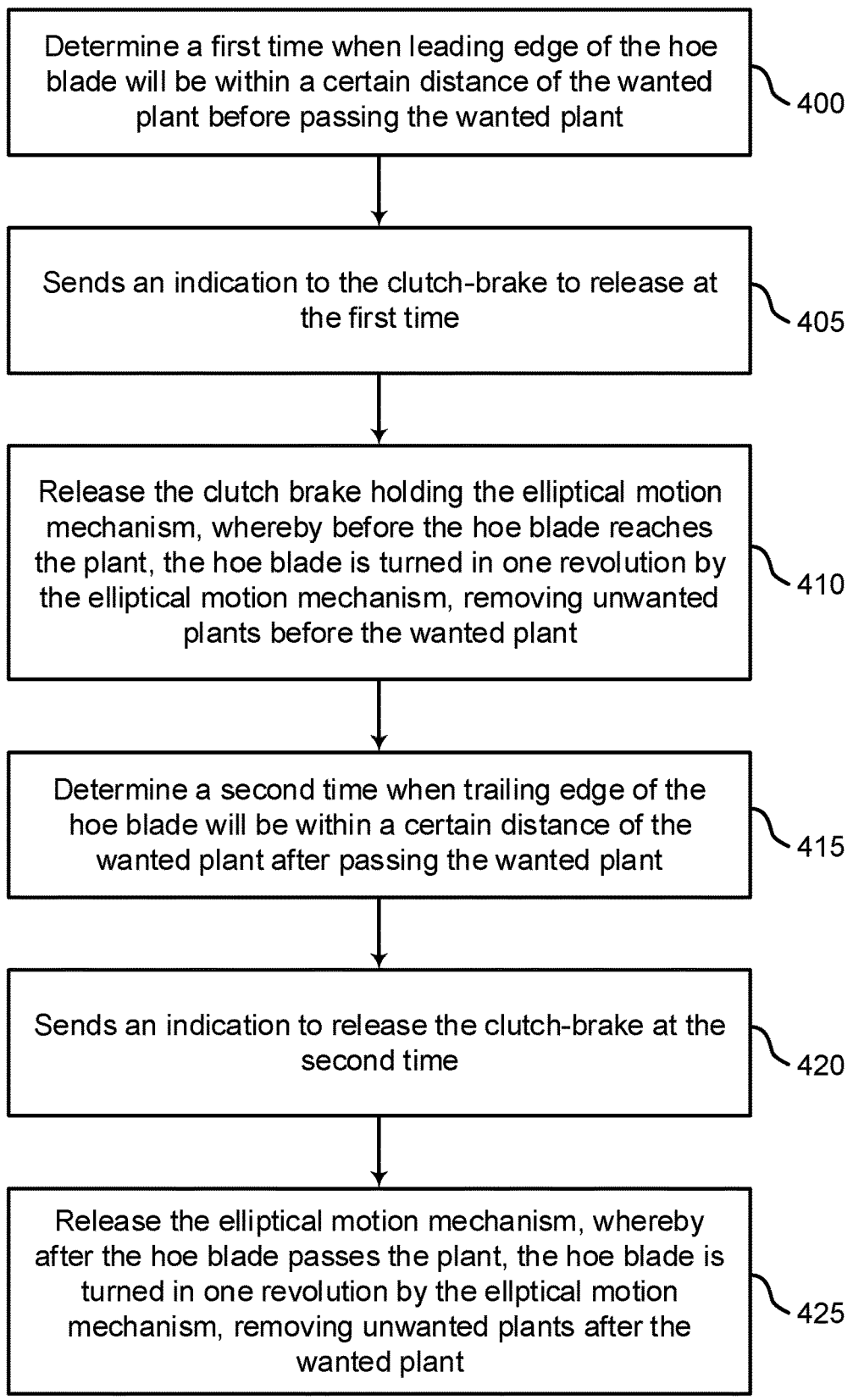

FIG. 4 shows an example of a process for disturbing soil according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

Referring to FIG. 4, an exemplary method for automated hoeing to clear the soil before and after a wanted plant, while the soil-disturbing/hoeing apparatus is traversing the field, is shown. In the first step, the hoeing application determines a first time when the leading (forward) edge of the hoe blade will be within a certain distance of the wanted plant before passing the wanted plant. In some embodiments, the hoe blade center is a measured distance from the leading edge of the camera field of view. Then the time is determined based at least in part on the hoe blade width, a buffer around the plant and a time delay, wherein the time delay also depends on the speed of the tractor. In some embodiments, the hoeing application determines the first time based on data received from the camera application.

At the first time, the hoeing application sends a first indication to a clutch-brake, coupled to a motor of the elliptical motion mechanism (described further in FIGS. 6-9), to release. Upon receiving the first indication, the clutch-brake releases the elliptical motion mechanism, whereby before the hoe blade reaches the wanted plant the hoe blade is turned in one revolution by the elliptical motion mechanism, whereby any unwanted plant or plants located in the path of the hoe blade are removed. As the soil-disturbing/hoeing apparatus continues to traverse the field, the hoeing application determines a second time when the trailing (rearwards) end of the hoe blade will be within a certain distance of the wanted plant after passing the wanted plant.

At the second time, the hoeing application sends a second indication to the clutch-brake to release. Upon receiving the second indication, the clutch-brake releases the elliptical motion mechanism, whereby after the hoe blade passes the plant, the hoe blade is turned in one revolution by the elliptical motion mechanism, whereby any unwanted plant or plants located in the path of the hoe blade are removed.

Thus, at operation 400, the system determines a first time when leading edge of the hoe blade will be within a certain distance of the wanted plant before passing the wanted plant. In some cases, the operations of this step may refer to, or be performed by, an application as described with reference to FIG. 1.

At operation 405, the system sends an indication to the clutch-brake to release at the first time. In some cases, the operations of this step may refer to, or be performed by, an application as described with reference to FIG. 1.

At operation 410, the system releases the clutch brake holding the elliptical motion mechanism, whereby before the hoe blade reaches the plant, the hoe blade is turned in one revolution by the elliptical motion mechanism, removing unwanted plants before the wanted plant. In some cases, the operations of this step may refer to, or be performed by, a frame as described with reference to FIGS. 1, 5, 9-15, and 21.

At operation 415, the system determines a second time when trailing edge of the hoe blade will be within a certain distance of the wanted plant after passing the wanted plant. In some cases, the operations of this step may refer to, or be performed by, an application as described with reference to FIG. 1.

At operation 420, the system sends an indication to release the clutch-brake at the second time.

At operation 425, the system releases the elliptical motion mechanism, whereby after the hoe blade passes the plant, the hoe blade is turned in one revolution by the elliptical motion mechanism, removing unwanted plants after the wanted plant. In some cases, the operations of this step may refer to, or be performed by, a frame as described with reference to FIGS. 1, 5, 9-15, and 21.

Figure 5:
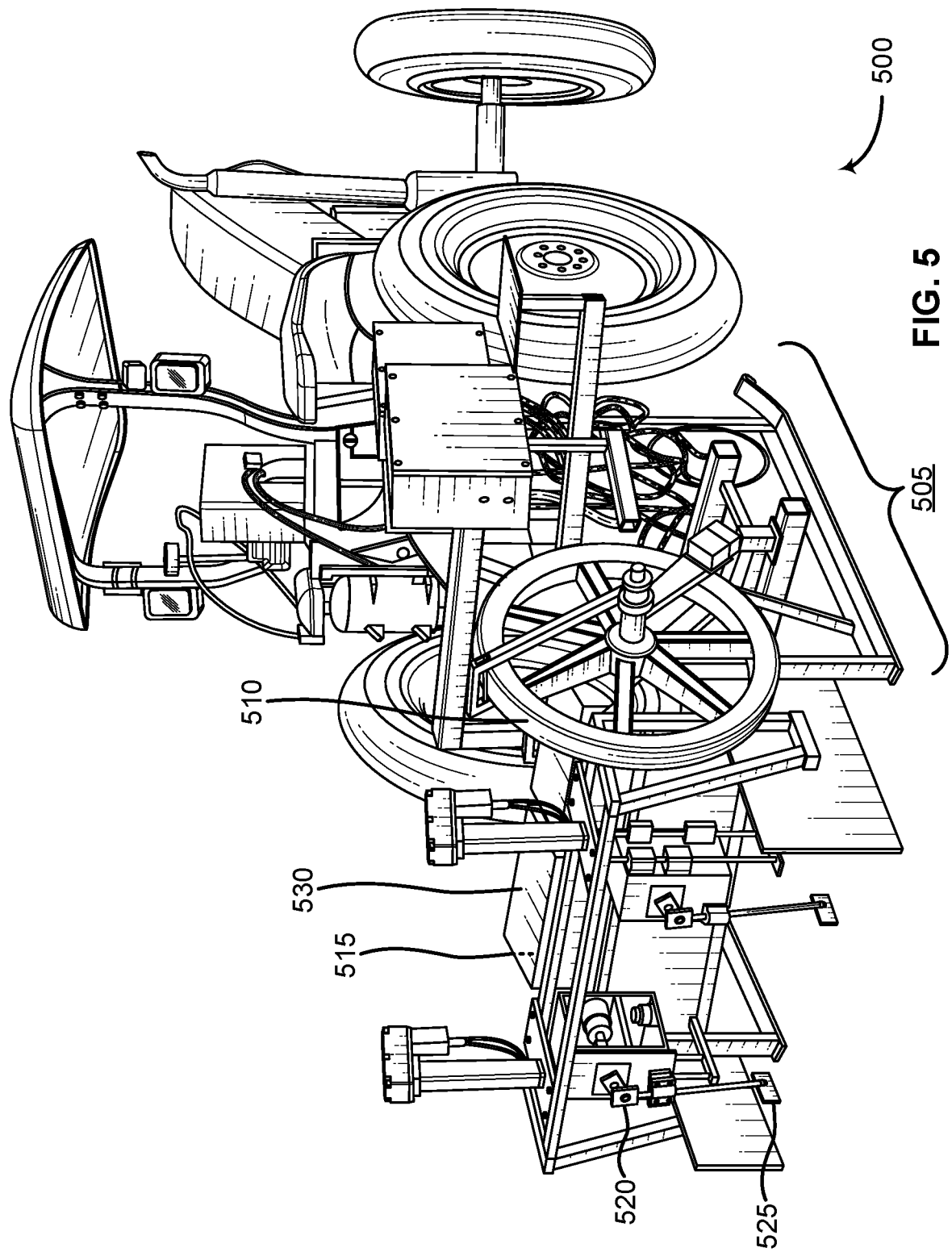
FIG. 5 shows an example of a soil disturbing apparatus according to aspects of the present disclosure.

FIG. 5 shows an example of a soil disturbing apparatus according to aspects of the present disclosure. The example shown includes tractor 500, frame 505, distance tracking mechanism 510, camera 515, elliptical motion mechanism 520, hoe 525, and light shielding box 530.

Referring to FIG. 5, an exemplary embodiment of the soil-disturbing/hoeing apparatus is shown. The frame 505 includes structural members configured to provide a structural framework for the frame 505 and to provide locations to mount the additional elements such as the camera 515 and the elliptical motion mechanism 520. In the embodiment shown, the sled-like frame 505 is supported on the ground and slides on at least two runners. In other embodiments the frame 505 may be supported and traverse the field via wheels, caterpillar treads, or other suitable support/means of locomotion. In the present embodiment, the frame 505 is removably coupled to the tractor 500 via a three-point hitch connection. Any suitable means of coupling the frame 505 to the vehicle may be used. In some embodiments the frame 505 may be self-propelling, i.e. the frame itself may be vehicular.

As shown in FIG. 5, a front (i.e. in the direction of travel) portion of the frame 505 is coupled to a tractor 500. As the tractor 500 is driven on the field, it pulls the frame 505 behind it, whereby the frame 505 traverses the field. Any vehicle suitable for attaching to and pulling (or pushing) the frame 505 in the field may be used.

Two light-shielding boxes are shown coupled to the frame 505 proximate to the front end of the frame 505, a left light-shielding box and a right light-shielding box. Inside each box (and therefore not visible) is a digital camera 515. Each light-shielding box is open on the bottom, with the camera 515 lens oriented downwards to take photos of the field directly below. The light-shielding boxes prevent excess light from obscuring the plants in the digital photos. The light-shielding boxes may not be necessary due to the ambient light conditions in the field.

Other methods may be used to identify the plant in the photographs (e.g. post-processing) or other methods may be used to shield the camera 515 lenses.

Alternatively, other suitable devices and methods may be used to identify plants (e.g. a sensor or sensors that do not utilize photographs). Located rearward behind each camera 515 (i.e. in the opposite direction of travel) is an elliptical hoe 525 device mounted to the frame 505. Each elliptical hoe 525 device includes an elliptical motion mechanism 520 and a hoe 525 with a blade located proximate to the ground and distal to the elliptical motion mechanism 520. The elliptical hoe 525 device is shown and described further in FIG. 6.

An optional distance-tracking wheel is also shown in FIG. 5. The wheel is rotated by friction with the ground as the soil-disturbing/hoeing apparatus traverses the field, tracking the distance of travel. Alternative distance tracking systems and methods are also contemplated. For example, ground-tracking radar may be used. In some embodiments the distance tracking has an accuracy within 0.5%. In another embodiment, the distance tracking has an accuracy within 0.2%. In another embodiment, the distance tracking has an accuracy such that when using the distance tracking to calculate the location of the hoe blade with respect to a plant, the accuracy of the hoe blade location is ⅛" or less. The wheel is coupled to an encoder, which sends the distance-traveled data to the PLC. In the embodiment shown in FIG. 5, the PLC receives the distance data from the wheel and operates the camera 515 to take a photo at regular distance intervals. The PLC also uses the distance data from the wheel to determine when the hoe 525 will be at the correct distance to remove the selected plant.

Frame 505 may be an example of, or include aspects of, the corresponding element or elements described with reference to FIGS. 1, 9-15, and 21.

Camera 515, elliptical motion mechanism 520, and hoe 525 may be an example of, or include aspects of, the corresponding element or elements described with reference to FIG. 1.

Light shielding box 530 may be coupled to the frame 505, where the camera 515 is located within the light-shielding box, where the light-shielding box is configured to shield the camera 515 lens from excess light that would prevent plants from being identified in the photographs.

Figure 6:
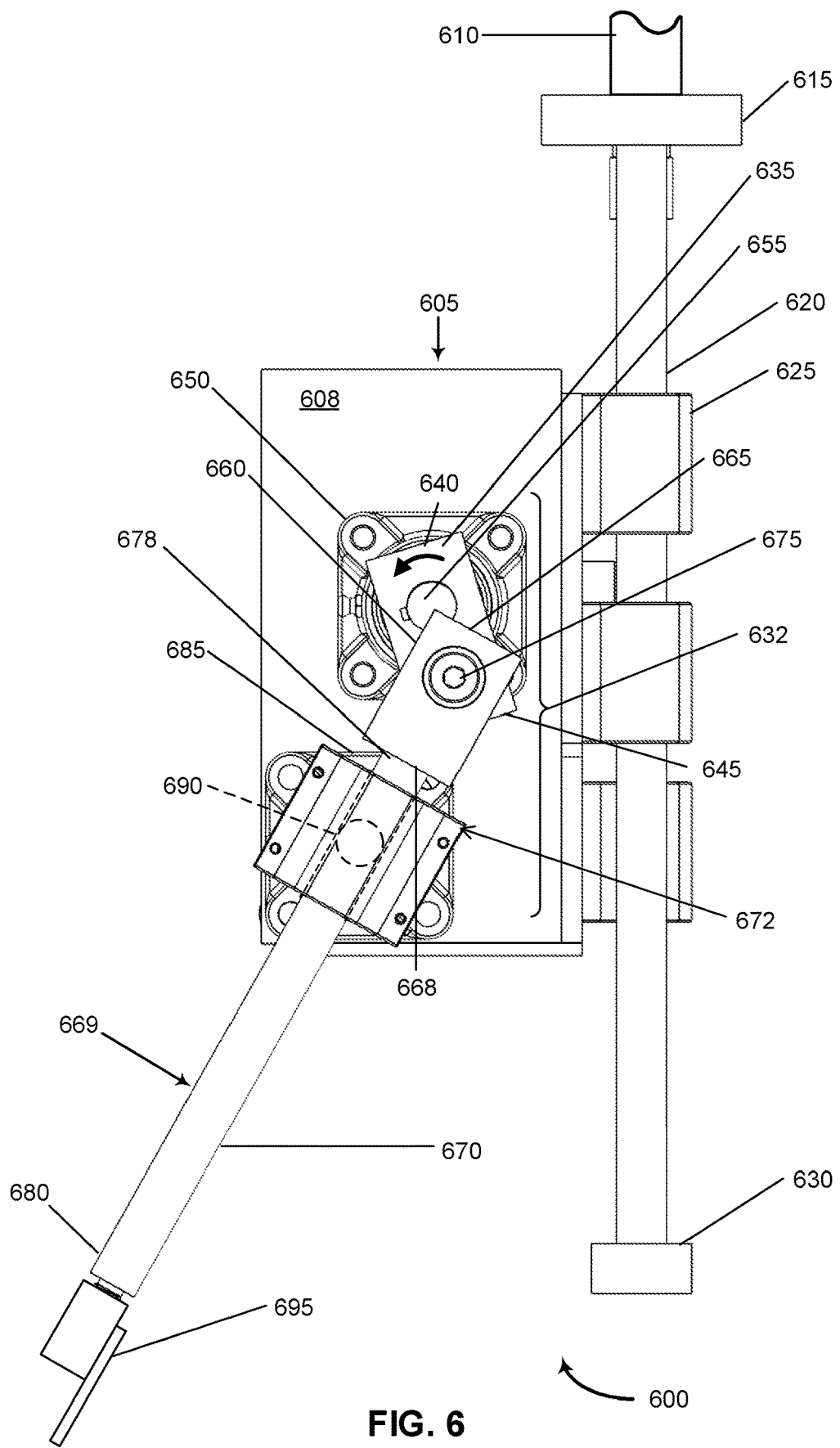
FIG. 6 shows an example of a rear view an elliptical hoe device according to aspects of the present disclosure.

FIG. 6 shows an example of a rear view an elliptical hoe device 600 according to aspects of the present disclosure.

Figure 7:
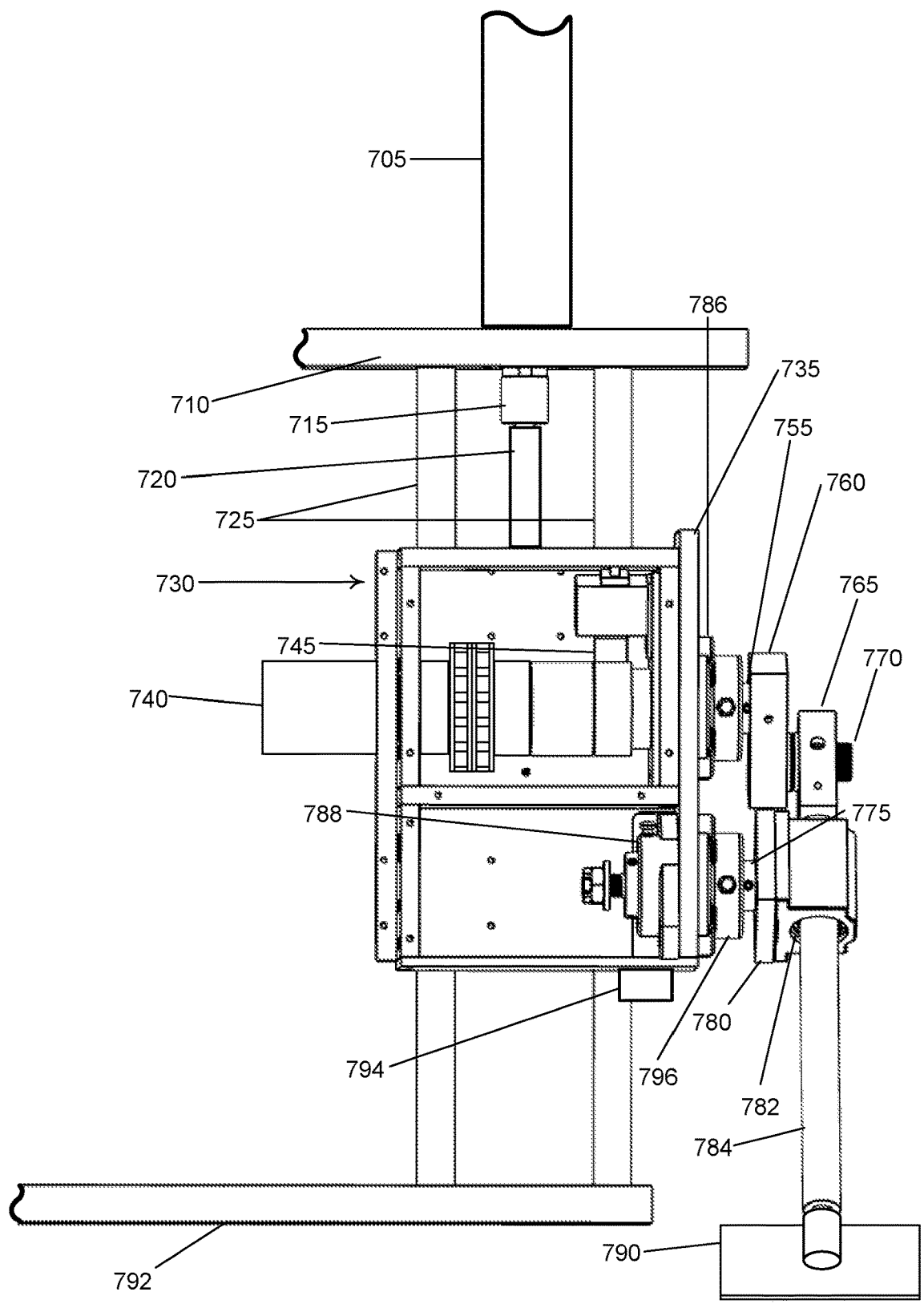
FIG. 7 shows an example of a side view of an elliptical hoe device according to aspects of the present disclosure.
Figure 8:
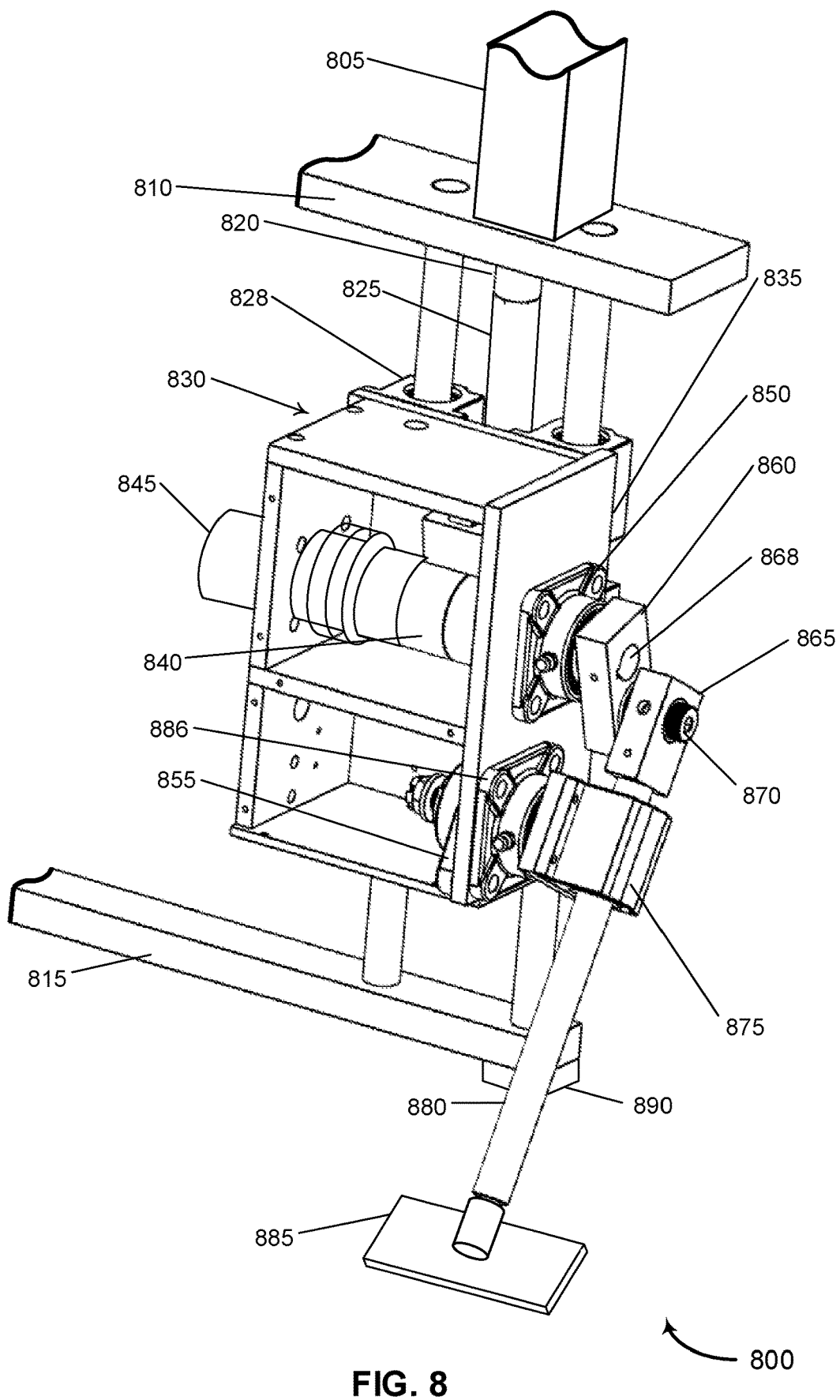
FIG. 8 shows an example of a perspective view of an elliptical hoe device according to aspects of the present disclosure.

Referring to FIGS. 6-8, an exemplary elliptical hoe device 600 is shown. A housing 605 is coupled to the frame. In the embodiment shown, horizontal upper and lower beams 630 are coupled to and extend outward from the frame (connection to the frame is not shown in FIGS. 6-8). A plurality of vertical posts 620 are interposed between the upper beam 615 and lower beam 630. In the embodiment shown in FIGS. 6-8, there are two vertical posts 620. The housing 605 is coupled to the vertical posts 620 via the linear bearings 625. Each linear bearing 625 is coupled to the housing 605 and includes a cylindrical hole through which the posts 620 are slidingly coupled. Also shown is a linear actuator 610 coupled to the frame and the housing 605 and configured to move the housing 605 upward and downward along the posts 620.

A ground sensor is coupled to the linear actuator 610, although the ground sensor may be coupled to any suitable portion of the elliptical hoe device 600. The ground sensor is configured to continually determine the distance between the ground sensor and the field surface as the apparatus traverses the field. In one embodiment the ground sensor is communicatively coupled to the hoeing application and sends the distance to the hoeing application, which in turn sends a signal to the linear actuator 610. Alternatively, the ground sensor may communicate directly with the linear actuator 610. In response to receiving the signal, the linear actuator 610 moves the housing 605 such that a consistent distance is maintained between the field surface and the hoe blade 695, i.e. the height of the hoe blade 695 is adjusted to follow the ground contour.

The housing 605 may house the motor. In the present embodiment the motor is a hydraulic motor. An electric motor or other suitable type of motor may also be used. A horizontal rotational shaft 655 of the motor extends rearward through a rear wall of the housing 655, i.e. the shaft 655 is generally aligned with the direction of travel. A first longitudinal arm 635 has a first end 640 and a second end 645. The first end 640 is coupled to the motor shaft 655 such that the second end 645 rotates about the shaft 655 in a circular direction, like a clock arm. A second arm 660 has a first end 665 and a second end 668. The first end 665 is pivotally coupled with a first pin 675 to the second end 645 of the first arm 635. The hoe shaft 670 has a first end 678 and a second end 680. The hoe shaft first end 678 is fixedly coupled to the second end 668 of the second arm 660.

The hoe shaft 670 in the present embodiment is oriented in a generally vertical plane generally perpendicular to the direction of travel (i.e. is generally vertical when viewed from the side as in FIG. 7). It will be understood that the hoe shaft 670 orientation may be angled forwards or backwards with respect to vertical (i.e. rotated left or right from vertical in the view of FIG. 7). In some examples, the angle from vertical is less than 5 degrees. In other examples, the angle from vertical is less than 10 degrees. In yet other examples, the angle may be less than 45 degrees. The angle of the hoe shaft 670 from vertical may be due to secondary considerations such as construction tolerances, or may be determined by the ground profile or a desired entry angle for the hoe blade 695.

A second end 680 of the hoe shaft 670 is located downwards, proximate to the ground. A blade 695 is coupled to the second end 680 of the hoe shaft 670. The hoe blade 695 in the present embodiment is a generally rectangular plate shape and the plate is generally oriented in a vertical plane parallel to travel. The hoe blade 695 may be of any suitable shape. In some embodiments, the blade 695 may have a concave shape. In some embodiments the blade 695 includes a chipper extension on each side. The chipper extension is described further below in FIG. 18.

In yet another embodiment in lieu of a hoe blade 695 a generally horizontally-orients wire may be coupled to the second end 680 of the hoe shaft 670, whereby in operation the wire slices the roots from the unwanted plants. In the embodiment of FIGS. 6-8, the plane of the hoe blade 695 is generally parallel to the longitudinal axis of the hoe shaft 670 (as shown in FIG. 6). In other embodiments the plane of the hoe blade 695 may be at an angle relative to the longitudinal axis of the hoe shaft 670. It will be understood that the angle of the hoe blade 695 in combination with the size, orientation and location of the elliptical path will be selected by the user to result in the desired effect of the hoe blade 695 on the soil.

A hoe shaft guide 672 including a cylindrical hole is pivotally coupled to a rear face 608 of the housing 605. A center portion of the hoe shaft 670 passes through the cylindrical hole. The hoe shaft guide 672 is pivotally coupled to the housing 605 via the bearing shaft 690. The hoe shaft guide 672 limits the directional movement of the hoe shaft 670 as part of the generation of the elliptical movement. The hoe shaft 670 freely slides within the cylindrical hole, and the shaft guide 672 has rotational freedom about the axis of the bearing shaft 690 (the axis of the bearing shaft 690 is also referred to as the hoe guide shaft pivot point). Thus the centerline of the hoe shaft 670 must always align with the bearing shaft 690. This geometrical configuration is described further below with respect to FIGS. 16 and 17.

In the present embodiments a linear actuator 610 is used to continually adjust the housing 605 up or down to maintain a consistent relationship between the ground surface and the elevation of the hoe blade 695. In the embodiment shown in FIGS. 6-8 one linear actuator 610 is used per housing 605. The vertically-oriented actuator 610 is interposed between and supported by two horizontal beams: an upper beam 615 and a lower beam 630. Each beam 615, 630 is coupled to and supported by the frame. The housing 605 is coupled to the actuator 610 via a rod and a coupler. While in the present embodiment a separate actuator controls each housing, embodiments where a single actuator controls the height of multiple housings are also contemplated.

A motor is coupled to and drives the vertically-oriented linear actuator 610, whereby the housing 605 is raised or lowered relative to the frame. The vertical movement of the housing 605 is described in more detail with response to FIGS. 6-8. In the present embodiment the motor is a programmable electric motor configured to communicate with input sensors and run software applications, including software application using data received from the input sensors. In the present embodiment, the programmable electric motor receives data from a ground sensor and is programmed to use the ground sensor data to determine activation of the linear actuator 610. In operation, the ground sensor coupled to the smart motor continually monitors the ground surface elevation and sends the data to the smart motor. The smart motor continually controls the linear actuators 610 to adjust the height of the housing 605 so that the hoe blade 695 is located at a consistent distance with respect to the ground surface. This vertical adjustment ensures that the hoe blade 695 enters the ground at the same point in the elliptical path each time the hoe blade 695 enters the ground, providing a consistent result.

In the embodiment of FIGS. 6-8, a clutch-brake is coupled to the motor shaft 655 between the motor and the elliptical motion device. To operate the elliptical hoeing device, the hoeing application sends a release signal to the clutch-brake. When the clutch brake releases the motor shaft 655 in response to the release signal, the motor turns the motor shaft 655 turns such that the hoe blade 695 completes one revolution of the elliptical motion. In the present embodiment, the clutch brake is a mechanical spring clutch brake. In another embodiment, the clutch brake may be an electric-magnetic clutch brake. In another embodiment a "smart" electric motor is used in lieu of the motor-clutch brake combination.

Elliptical hoe device 600 may be an example of, or include aspects of, the corresponding element or elements described with reference to FIGS. 7-15. Elliptical hoe device 600 may include housing 605, linear actuator 610, upper beam 615, post 620, linear bearing 625, lower beam 630, first arm 635, first flange-mounted ball bearing 650, motor shaft 655, second arm 660, first pin 675, hoe shaft 670, second flange-mounted ball bearing 685, bearing shaft 690, hoe blade 695.

Housing 605 may be an example of, or include aspects of, the corresponding element or elements described with reference to FIGS. 7-15. Linear actuator 610 may be an example of, or include aspects of, the corresponding element or elements described with reference to FIGS. 7 and 8.

Upper beam 615 may be an example of, or include aspects of, the corresponding element or elements described with reference to FIGS. 7 and 8. Post 620 may be an example of, or include aspects of, the corresponding element or elements described with reference to FIG. 7. Lower beam 630, and first arm 635 may be examples of, or include aspects of, the corresponding element or elements described with reference to FIGS. 7 and 8.

First arm 635 may include first arm first end 640 and first arm second end 645. First flange-mounted ball bearing 650 may be an example of, or include aspects of, the corresponding element or elements described with reference to FIGS. 7 and 8.

Motor shaft 655 may be an example of, or include aspects of, the corresponding element or elements described with reference to FIG. 7.

Second arm 660 may be an example of, or include aspects of, the corresponding element or elements described with reference to FIGS. 7 and 8. Second arm 660 may include second arm first end 665 and second arm second end 668.

First pin 675 may be an example of, or include aspects of, the corresponding element or elements described with reference to FIGS. 7 and 8.

Hoe 669 may include hoe shaft 670 and hoe blade 695. Hoe shaft 670 may be an example of, or include aspects of, the corresponding element or elements described with reference to FIGS. 7-15, and 20. Hoe shaft 670 may include hoe shaft first end 678 and hoe shaft second end 680.

Second flange-mounted ball bearing 685 may be an example of, or include aspects of, the corresponding element or elements described with reference to FIGS. 7 and 8.

Bearing shaft 690 may be an example of, or include aspects of, the corresponding element or elements described with reference to FIG. 7. Bearing shaft 690 may be an example of, or include aspects of, the corresponding element or elements described with reference to FIG. 7.

Hoe blade 695 may be coupled to the second end of the shaft such that the hoe blade 695 in an initial position is proximate to a soil surface, and wherein a face of the hoe blade 695 is located in a plane intersecting with the plane of the elliptical path, wherein the soil-disturbing apparatus is configured to receive a signal to operate the elliptical motion mechanism 632; and in response to receiving the signal, operate the elliptical motion mechanism 632, whereby the hoe blade 695 is moved in an elliptical path congruent to the elliptical path of the second end, whereby a portion of the hoe blade elliptical path falls below the soil surface, whereby soil in the path of the hoe blade 695 is disturbed.

In some examples, the hoe blade face is oriented such that at the time during the elliptical motion when the hoe blade 695 enters the soil surface, the hoe blade face plane is tangential to the hoe blade 695 elliptical path. In some examples, the hoe blade 695 further includes a chipper extension extending outward in a generally perpendicular direction from each side edge of the hoe blade 695, where each chipper extension extends in the direction of elliptical motion travel of the hoe blade 695. In some examples, the speed of the hoe blade 695 while moved in the elliptical path is less than 300 rpm.

In some examples, the hoe blade 695 has a generally rectangular plate shape, where the plate is oriented in a plane generally perpendicular to the plane of the elliptical path. Hoe blade 695 may be an example of, or include aspects of, the corresponding element or elements described with reference to FIGS. 7-15, 19, and 20.

FIG. 7 shows an example of a side view of an elliptical hoe device 700 according to aspects of the present disclosure. Elliptical hoe device 700 may be an example of, or include aspects of, the corresponding element or elements described with reference to FIGS. 6, and 8-15.

Elliptical hoe device 700 may include linear actuator 705, upper beam 710, coupler 715, rod 720, post 725, housing 730, motor shaft 755, first arm 760, second arm 765, first pin 770, bearing shaft 775, hoe shaft guide 780, hoe shaft 784, first flange-mounted ball bearing 786, third flange-mounted ball bearing 788, hoe blade 790, lower beam 792, and ground sensor 794, and second flange-mounted ball bearing 796.

Linear actuator 705 and upper beam 710 may be examples of, or include aspects of, the corresponding element or elements described with reference to FIGS. 6 and 8.

Coupler 715, and rod 720 may be examples of, or include aspects of, the corresponding element or elements described with reference to FIG. 8.

Post 725 may be an example of, or include aspects of, the corresponding element or elements described with reference to FIG. 6. Housing 730 may be an example of, or include aspects of, the corresponding element or elements described with reference to FIGS. 6, and 8-15.

Housing 730 may include housing rear wall 735, motor 740, and clutch brake 745. Housing rear wall 735 may be an example of, or include aspects of, the corresponding element or elements described with reference to FIG. 8.

Motor 740 and clutch brake 745 may be examples of, or include aspects of, the corresponding element or elements described with reference to FIG. 8.

Motor shaft 755 may be an example of, or include aspects of, the corresponding element or elements described with reference to FIG. 6.

First arm 760, second arm 765, and first pin 770 may be examples of, or include aspects of, the corresponding element or elements described with reference to FIGS. 6 and 8. Bearing shaft 775 may be an example of, or include aspects of, the corresponding element or elements described with reference to FIG. 6.

Hoe shaft guide 780 may be an example of, or include aspects of, the corresponding element or elements described with reference to FIGS. 8, 16, and 17. Hoe shaft guide 780 may include cylindrical hole 782. Hoe shaft 784 may be an example of, or include aspects of, the corresponding element or elements described with reference to FIGS. 6, 8-15, and 20.

First flange-mounted ball bearing 786, second flange-mounted ball bearing 796, and third flange-mounted ball bearing 788 may be examples of, or include aspects of, the corresponding element or elements described with reference to FIGS. 6 and 8.

Hoe blade 790 may be an example of, or include aspects of, the corresponding element or elements described with reference to FIGS. 6, 8-15, 19, and 20. Lower beam 792 may be an example of, or include aspects of, the corresponding element or elements described with reference to FIGS. 6 and 8.

Ground sensor 794 may be configured to continually determine an elevation of the soil surface communicatively coupled to the actuator, wherein the actuator moves the housing 730 with respect to the frame in response to the determined elevation. Ground sensor 794 may be an example of, or include aspects of, the corresponding element or elements described with reference to FIG. 8.

FIG. 8 shows an example of a perspective view of an elliptical hoe device 800 according to aspects of the present disclosure. Elliptical hoe device 800 may be an example of, or include aspects of, the corresponding element or elements described with reference to FIGS. 6, 7, and 9-15.

Elliptical hoe device 800 may include linear actuator 805, upper beam 810, lower beam 815, coupler 820, rod 825, linear bearing 828, housing 830, motor 845, first flange-mounted ball bearing 850, third flange-mounted ball bearing 855, first arm 860, second arm 865, motor shaft 868, first pin 870, hoe shaft guide 875, hoe shaft 880, hoe blade 882, ground sensor 884, and second flange-mounted ball bearing 886.

Linear actuator 805, upper beam 810, and lower beam 815 may be examples of, or include aspects of, the corresponding element or elements described with reference to FIGS. 6 and 7. Coupler 820 and rod 825 may be examples of, or include aspects of, the corresponding element or elements described with reference to FIG. 7.

Housing 830 may be an example of, or include aspects of, the corresponding element or elements described with reference to FIGS. 6, 7, and 9-15. Housing 830 may include housing rear wall 835 and clutch brake 840.

Housing rear wall 835, clutch brake 840, and motor 845 may be examples of, or include aspects of, the corresponding element or elements described with reference to FIG. 7.

First flange-mounted ball bearing 850, second flange-mounted ball bearing 886, and third flange-mounted ball bearing 855 may be examples of, or include aspects of, the corresponding element or elements described with reference to FIGS. 6 and 7.

First arm 860, second arm 865 and first pin 870 may be examples of, or include aspects of, the corresponding element or elements described with reference to FIGS. 6 and 7. Hoe shaft guide 875 may be an example of, or include aspects of, the corresponding element or elements described with reference to FIGS. 7, 16, and 17.

Hoe shaft 880 and hoe blade 885 may be examples of, or include aspects of, the corresponding element or elements described with reference to FIGS. 6, 7, 9-15, 19, and 20. Ground sensor 890 may be an example of, or include aspects of, the corresponding element or elements described with reference to FIG. 7.

Figure 9:
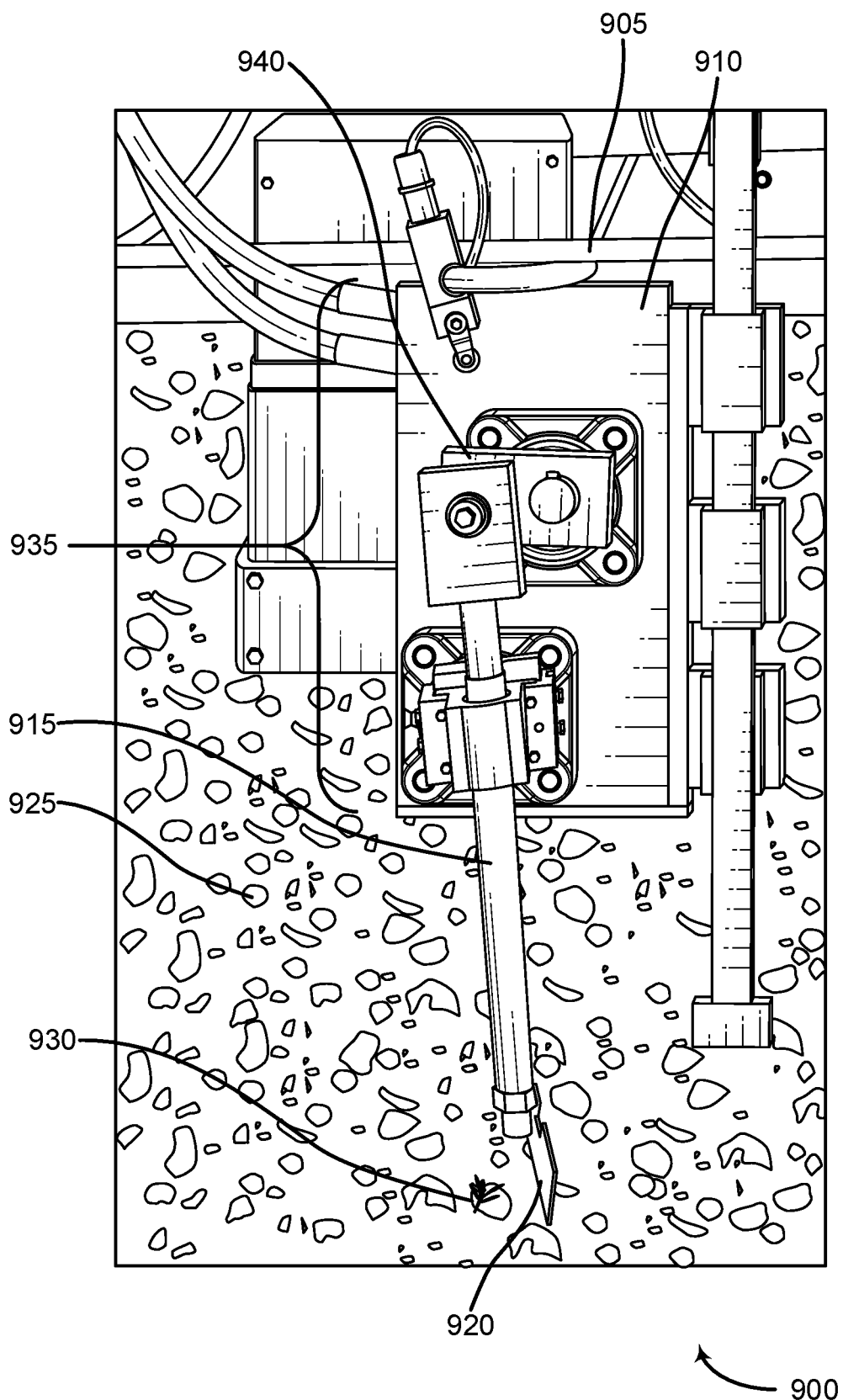
FIG. 9 shows an example of an elliptical hoe device at a first position according to aspects of the present disclosure.

FIG. 9 shows an example of an elliptical hoe device 900 at a first position according to aspects of the present disclosure. The example shown includes elliptical hoe device 900 and field surface 925.

Referring to FIGS. 9-14, the elliptical hoeing device is shown at various points in time during operation of the device. Shown in FIG. 9 are the housing 910, the frame 905, the elliptical hoe device 900, an elliptical motion mechanism 935, the hoe shaft 915, the hoe blade 920, a plant 930, an elliptical motion mechanism 935, a first arm 940, and a field surface 925.

In FIG. 9, the elliptical hoe device 900 is at a starting position. The apparatus is traversing the field and the hoeing application has determined that the plant 930 is to be removed. At the starting position the hoe shaft 915 is in a generally vertical position, with the blade 920 proximate to the field surface 925. The first arm 940 is in roughly a 9 o'clock position.

Elliptical hoe device 900 may be an example of, or include aspects of, the corresponding element or elements described with reference to FIGS. 6-8, and 10-15.

Elliptical hoe device 900 may include frame 905, housing 910, hoe shaft 915, hoe blade 920, elliptical motion mechanism 935, and first arm 940. Frame 905 may be an example of, or include aspects of, the corresponding element or elements described with reference to FIGS. 1, 5, 10-15, and 21. Housing 910 may be an example of, or include aspects of, the corresponding element or elements described with reference to FIGS. 6-8, and 10-15.

Hoe shaft 915 and hoe blade 920 may be examples of, or include aspects of, the corresponding element or elements described with reference to FIGS. 6-8, 10-15, 19, and 20. Elliptical motion mechanism 935 and first arm 940 may be examples of, or include aspects of, the corresponding element or elements described with reference to FIGS. 6-8 and 10-14. Field surface 925 may be an example of, or include aspects of, the corresponding element or elements described with reference to FIGS. 10-15, 18, and 19. Plant 930 may be an example of, or include aspects of, the corresponding element or elements described with reference to FIGS. 10-12.

Figure 10:
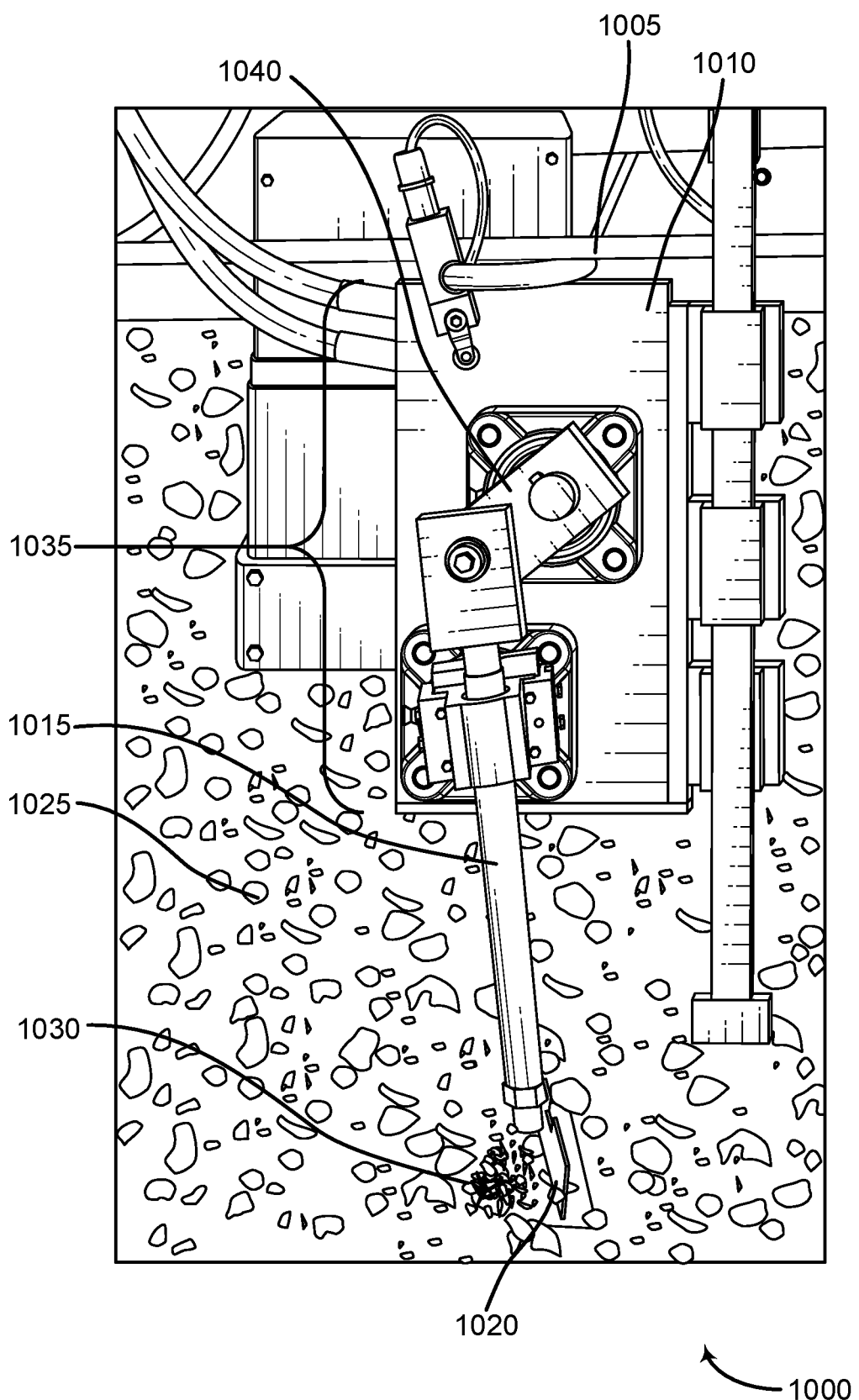
FIG. 10 shows an example of an elliptical hoe device at a second position according to aspects of the present disclosure.

FIG. 10 shows an example of an elliptical hoe device 1000 at a second position according to aspects of the present disclosure. The example shown includes elliptical hoe device 1000, a plant 1030 and field surface 1025.

In FIG. 10, the motor shaft has rotated in a counterclockwise direction, causing the first arm 1040 to also rotate in a counterclockwise direction. The first arm 1040 is now in a roughly 7 o'clock position. Due to the pivoting pin connection between the first arm 1040 and the second arm, and the guide shaft constraining the movement of the hoe shaft 1015 (while allowing the hoe shaft 1015 to slide within the cylindrical hole), the hoe blade 1020 is moved downwards and leftwards in an elliptical path. As the blade 1020 moves downwards it passes through the field surface 1025 and into the field soil, as shown.

Elliptical hoe device 1000 may be an example of, or include aspects of, the corresponding element or elements described with reference to FIGS. 6-9, and 11-15.

Elliptical hoe device 1000 may include frame 1005, housing 1010, hoe shaft 1015, and hoe blade 1020, an elliptical motion mechanism 1035, and a first arm 1040. Frame 1005 may be an example of, or include aspects of, the corresponding element or elements described with reference to FIGS. 1, 5, 9, 11-15, and 21. Housing 1010 may be an example of, or include aspects of, the corresponding element or elements described with reference to FIGS. 6-9, and 11-15.

Hoe shaft 1015 and hoe blade 1020 may be examples of, or include aspects of, the corresponding element or elements described with reference to FIGS. 6-9, 11-15, 19, and 20. Elliptical motion mechanism 1035 and first arm 1040 may be examples of, or include aspects of, the corresponding element or elements described with reference to FIGS. 6-9 and 11-14. Field surface 1025 may be an example of, or include aspects of, the corresponding element or elements described with reference to FIGS. 9, 11-15, 18, and 19. Plant 1030 may be an example of, or include aspects of, the corresponding element or elements described with reference to FIGS. 9 and 11-12.

Figure 11:
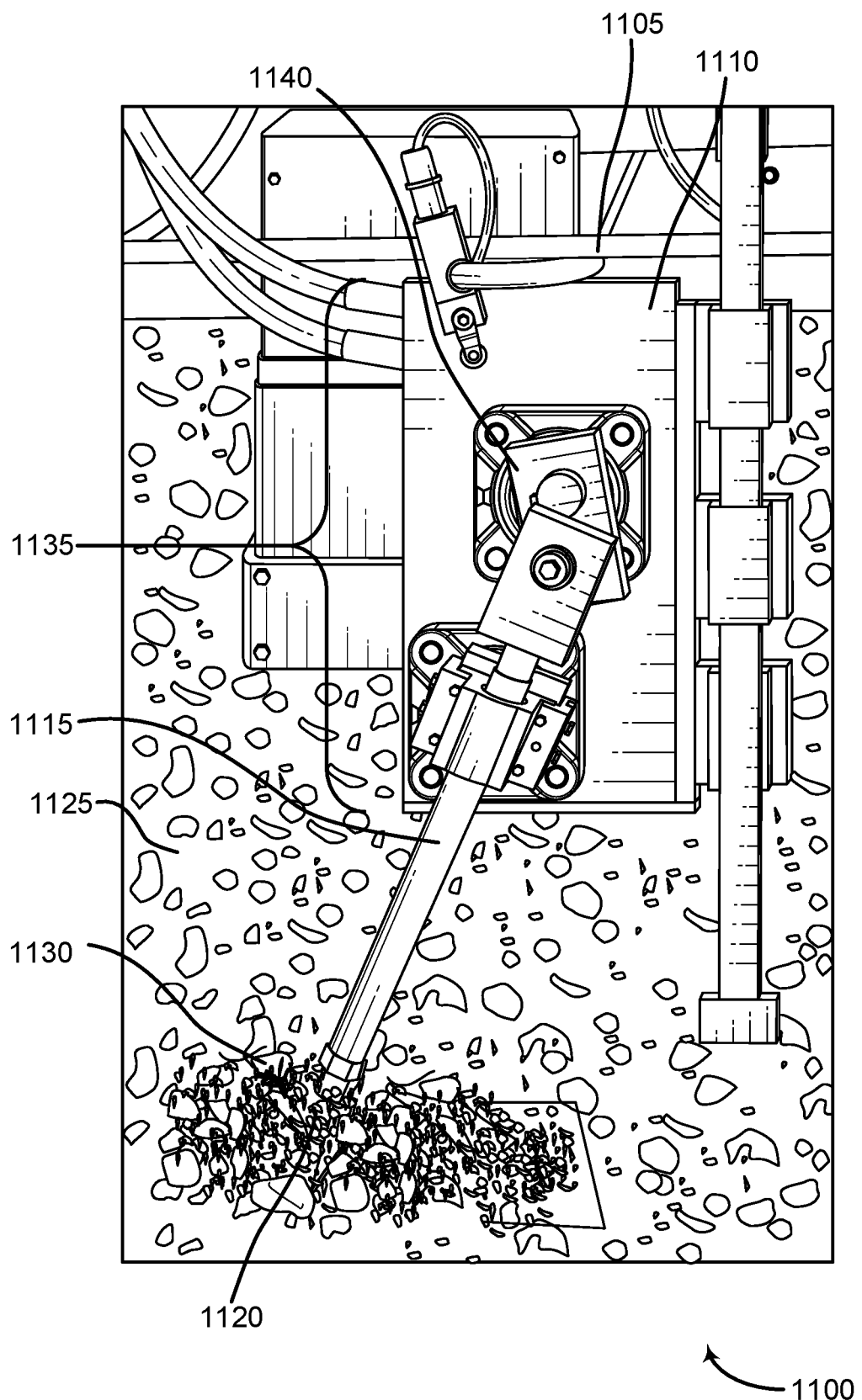
FIG. 11 shows an example of an elliptical hoe device at a third position according to aspects of the present disclosure.

FIG. 11 shows an example of an elliptical hoe device 1100 at a third position according to aspects of the present disclosure. The example shown includes elliptical hoe device 1100, plant 1130 and field surface 1125.

In FIG. 11 the motor shaft and the first arm 1140 continue to rotate counterclockwise, and the hoe blade 1120 has been further moved along the elliptical path. The first arm 1140 is now in a roughly 5 o'clock position. In FIG. 11, as a result of the elliptical path caused by the elliptical motion mechanism 1135 the blade 1120 has moved farther left, but also upwards, and is emerging from the soil. The plant 1130, being in the path of the blade 1120, is contacted by the blade 1120 and pushed along the path by the blade 1120, uprooting the plant 1130 from the soil.

Elliptical hoe device 1100 may be an example of, or include aspects of, the corresponding element or elements described with reference to FIGS. 6-10, and 12-15. Elliptical hoe device 1100 may include frame 1105, housing 1110, hoe shaft 1115, hoe blade 1120, elliptical motion mechanism 1135, and first arm 1140.

Frame 1105 may be an example of, or include aspects of, the corresponding element or elements described with reference to FIGS. 1, 5, 9, 10, 12-15, and 21. Housing 1110 may be an example of, or include aspects of, the corresponding element or elements described with reference to FIGS. 6-10, and 12-15.

Hoe shaft 1115 and hoe blade 1120 may be examples of, or include aspects of, the corresponding element or elements described with reference to FIGS. 6-10, 12-15, 19, and 20. Elliptical motion mechanism 1135 and first arm 1140 may be examples of, or include aspects of, the corresponding element or elements described with reference to FIGS. 6-10 and 12-14. Field surface 1125 may be an example of, or include aspects of, the corresponding element or elements described with reference to FIGS. 9, 10, 12-15, 18, and 19. Plant 1130 may be an example of, or include aspects of, the corresponding element or elements described with reference to FIGS. 9-10 and 12.

Figure 12:
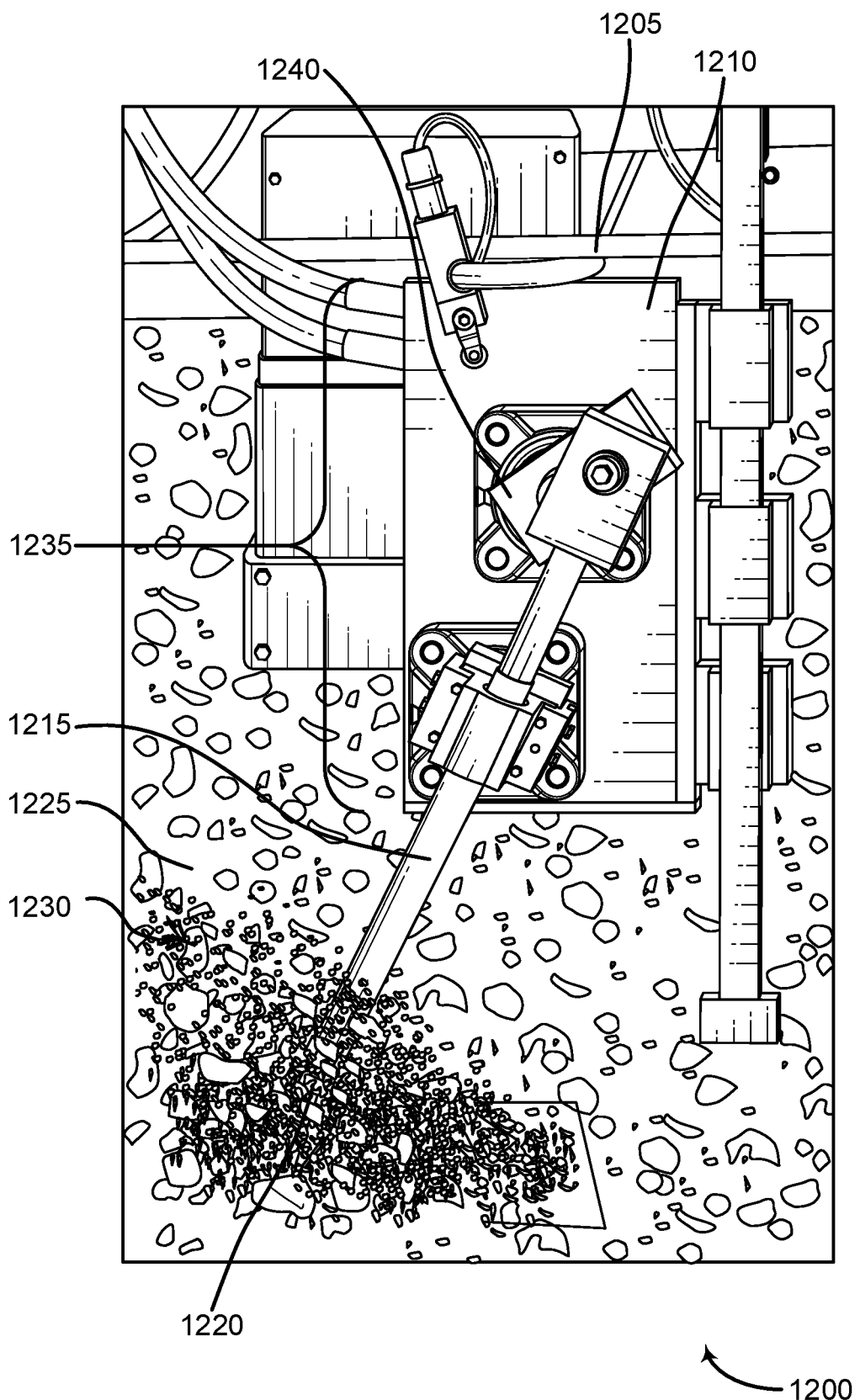
FIG. 12 shows an example of an elliptical hoe device at a fourth position according to aspects of the present disclosure.

FIG. 12 shows an example of an elliptical hoe device 1200 at a fourth position according to aspects of the present disclosure. The example shown includes elliptical hoe device 1200, field surface 1225, and plant 1230.

In FIG. 12 the motor shaft and the first arm 1240 continue to rotate counterclockwise. The first arm 1240 is now in a roughly 2 o'clock position. The blade 1220 continues to move leftwards and upwards in the elliptical path, finishing the trajectory portion of disturbing the soil and uprooting the plant 1230.

Elliptical hoe device 1200 may be an example of, or include aspects of, the corresponding element or elements described with reference to FIGS. 6-11, and 13-15. Elliptical hoe device 1200 may include frame 1205, housing 1210, hoe shaft 1215, and hoe blade 1220, an elliptical motion mechanism 1235, and a first arm 1240.

Frame 1205 may be an example of, or include aspects of, the corresponding element or elements described with reference to FIGS. 1, 5, 9-11, 13-15, and 21. Housing 1210 may be an example of, or include aspects of, the corresponding element or elements described with reference to FIGS. 6-11, and 13-15.

Hoe shaft 1215 may be an example of, or include aspects of, the corresponding element or elements described with reference to FIGS. 6-11, 13-15, and 20. Hoe blade 1220 may be an example of, or include aspects of, the corresponding element or elements described with reference to FIGS. 6-11, 13-15, 19, and 20. Elliptical motion mechanism 1235 and first arm 1240 may be examples of, or include aspects of, the corresponding element or elements described with reference to FIGS. 6-11 and 13-14. Field surface 1225 may be an example of, or include aspects of, the corresponding element or elements described with reference to FIGS. 9-11, 13-15, 18, and 19. Plant 1230 may be an example of, or include aspects of, the corresponding element or elements described with reference to FIGS. 9-11.

Figure 13:
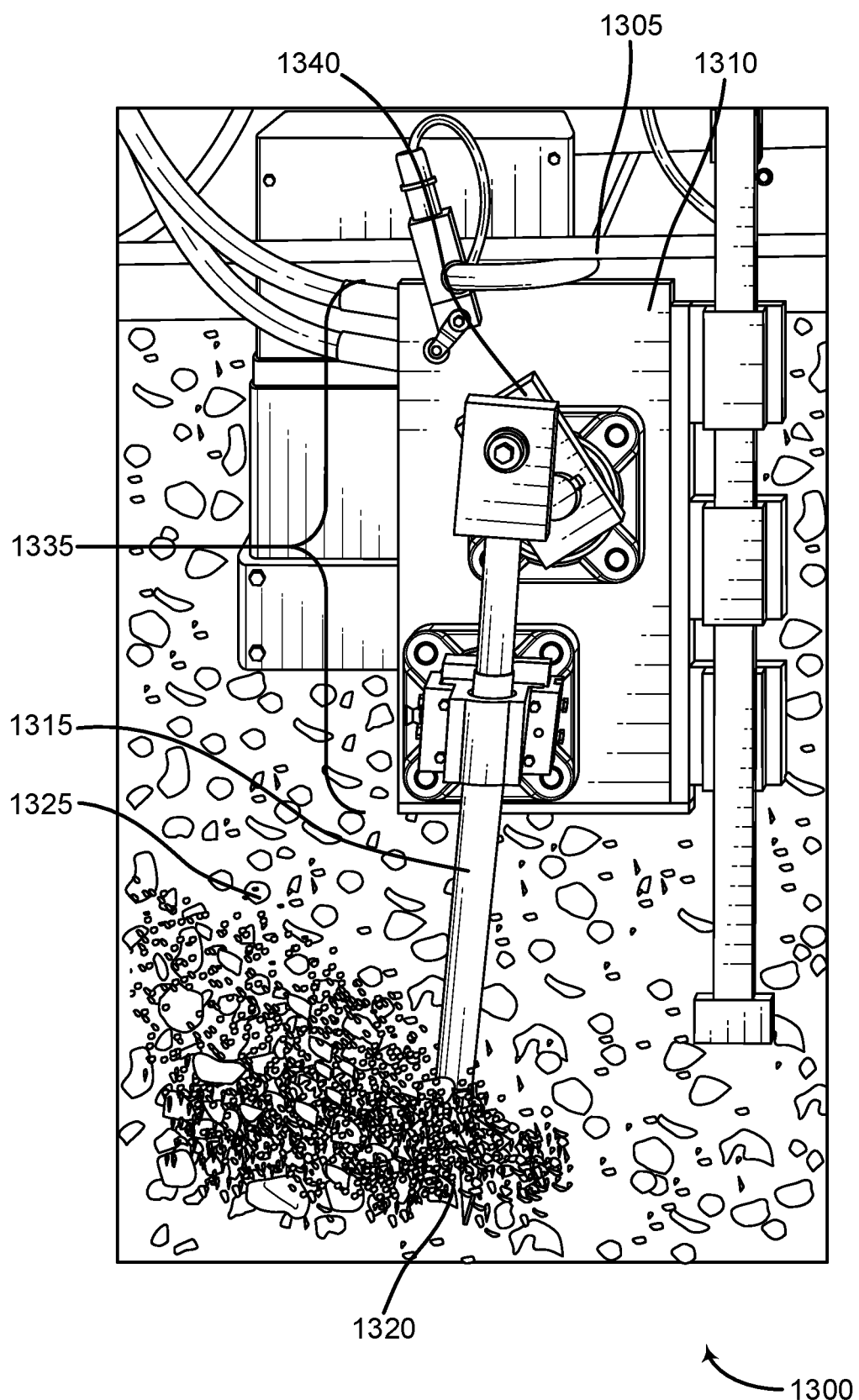
FIG. 13 shows an example of an elliptical hoe device at a fifth position according to aspects of the present disclosure.

FIG. 13 shows an example of an elliptical hoe device 1300 at a fifth position according to aspects of the present disclosure. The example shown includes elliptical hoe device 1300 and field surface 1325.

In FIG. 13 the motor shaft and the first arm 1340 continue to rotate counterclockwise. The first arm 1340 is now in a roughly 11 o'clock position. The hoe blade 1320 has traveled rightwards and upwards in the elliptical path.

Elliptical hoe device 1300 may be an example of, or include aspects of, the corresponding element or elements described with reference to FIGS. 6-12, 14, and 15. Elliptical hoe device 1300 may include frame 1305, housing 1310, hoe shaft 1315, and hoe blade 1320, an elliptical motion mechanism 1335, and a first arm 1340.

Frame 1305 may be an example of, or include aspects of, the corresponding element or elements described with reference to FIGS. 1, 5, 9-12, 14, 15, and 21. Housing 1310 may be an example of, or include aspects of, the corresponding element or elements described with reference to FIGS. 6-12, 14, and 15.

Hoe shaft 1315 may be an example of, or include aspects of, the corresponding element or elements described with reference to FIGS. 6-12, 14, 15, and 20. Hoe blade 1320 may be an example of, or include aspects of, the corresponding element or elements described with reference to FIGS. 6-12, 14, 15, 19, and 20. Elliptical motion mechanism 1335 and first arm 1340 may be examples of, or include aspects of, the corresponding element or elements described with reference to FIGS. 6-12 and 14. Field surface 1325 may be an example of, or include aspects of, the corresponding element or elements described with reference to FIGS. 9-12, 14, 15, 18, and 19.

Figure 14:
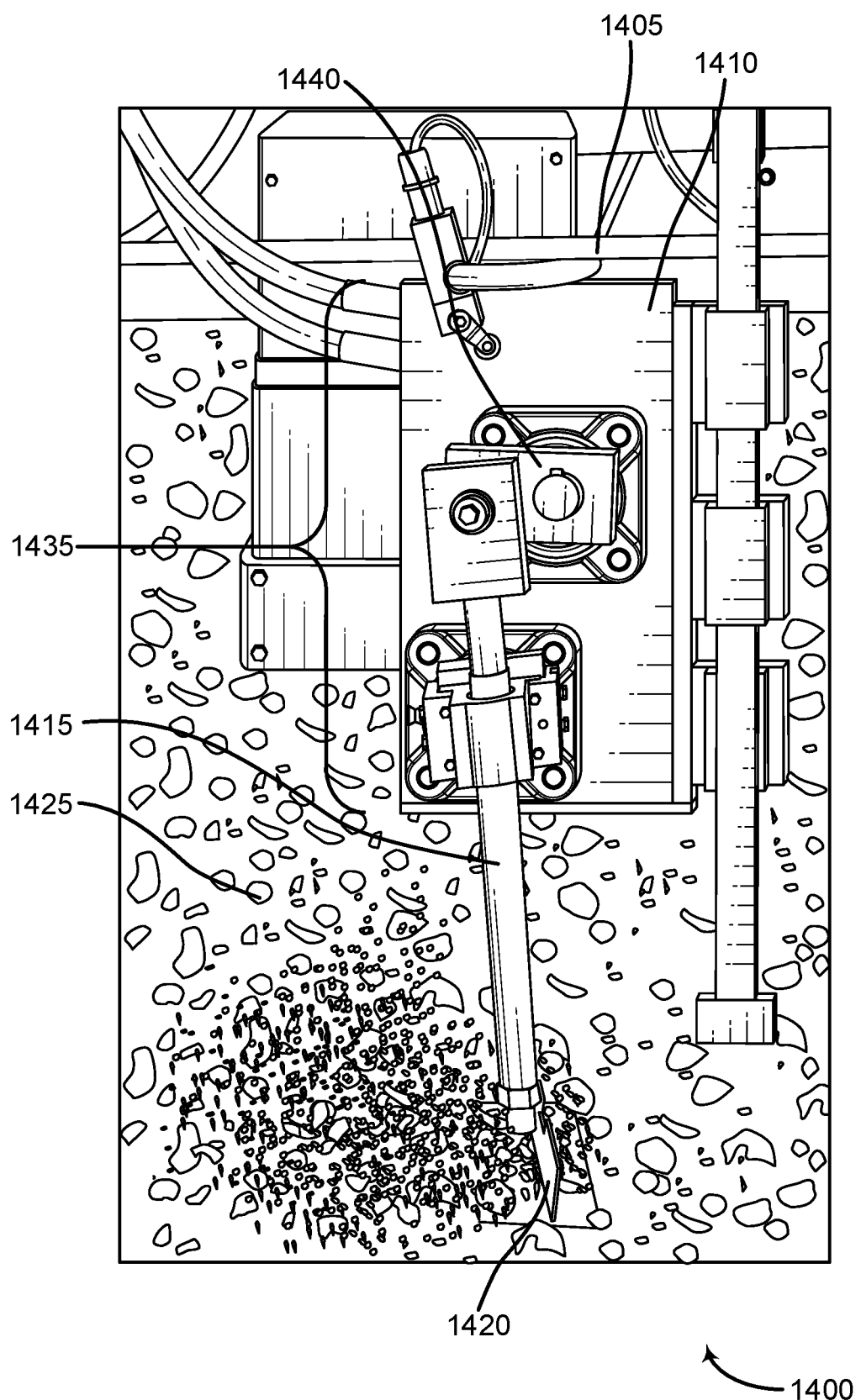
FIG. 14 shows an example of an elliptical hoe device at a sixth position according to aspects of the present disclosure.

FIG. 14 shows an example of an elliptical hoe device 1400 at a sixth position according to aspects of the present disclosure. The example shown includes elliptical hoe device 1400 and field surface 1425.

In FIG. 14 the motor shaft and the first arm 1440 have finished the full rotation and returned to the roughly 9 o'clock position of FIG. 9. The elliptical hoe device 1400 is now back in the starting position and prepared for the next elliptical path motion.

Elliptical hoe device 1400 may be an example of, or include aspects of, the corresponding element or elements described with reference to FIGS. 6-13, and 15. Elliptical hoe device 1400 may include frame 1405, housing 1410, hoe shaft 1415, and hoe blade 1420, an elliptical motion mechanism 1435, and a first arm 1440.

Frame 1405 may be an example of, or include aspects of, the corresponding element or elements described with reference to FIGS. 1, 5, 9-13, 15, and 21. Housing 1410 may be an example of, or include aspects of, the corresponding element or elements described with reference to FIGS. 6-13, and 15.

Hoe shaft 1415 may be an example of, or include aspects of, the corresponding element or elements described with reference to FIGS. 6-13, 15, and 20. Hoe blade 1420 may be an example of, or include aspects of, the corresponding element or elements described with reference to FIGS. 6-13, 15, 19, and 20. Elliptical motion mechanism 1435 and first arm 1440 may be examples of, or include aspects of, the corresponding element or elements described with reference to FIGS. 6-13. Field surface 1425 may be an example of, or include aspects of, the corresponding element or elements described with reference to FIGS. 9-13, 15, 18, and 19.

Figure 15:
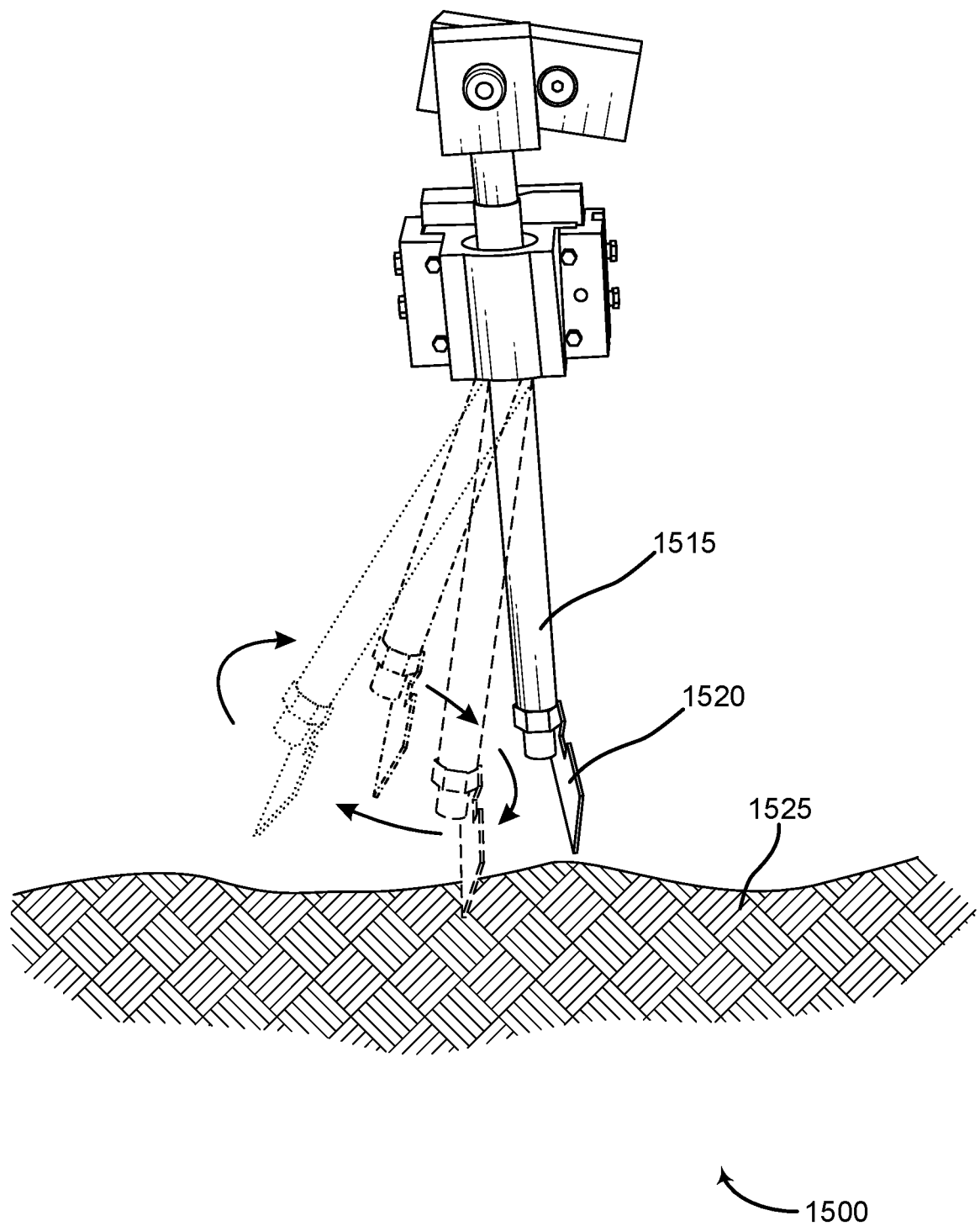
FIG. 15 shows an example of a hoe completing the elliptical path according to aspects of the present disclosure.

FIG. 15 shows an example of a hoe completing the elliptical path according to aspects of the present disclosure. The example shown includes elliptical hoe device 1500 and field soil 1525.

Referring to FIG. 15, a diagram of the hoe device 1500 completing the elliptical path is shown. The arrows indicate the elliptical path of the hoe blade 1520. As shown, as the blade 1520 follows the elliptical path the blade 1520 moves downwards and leftwards into the soil 1525 below the field surface, then travels upwards and leftwards, emerging from the soil 1525, and finally returns rightwards along the elliptical path to the starting position. It will be understood by those of ordinary skill in the art that the elliptical hoeing device may be configured in the mirror image of the device shown in FIGS. 9-14, which would provide for the hoe blade 1520 to sweep in the opposite direction. An exemplary soil-disturbing/hoeing apparatus including both left-hand and right-hand elliptical hoeing devices is described further below with respect to FIG. 21.

Elliptical hoe device 1500 may be an example of, or include aspects of, the corresponding element or elements described with reference to FIGS. 6-14. Elliptical hoe device 1500 may include hoe shaft 1515, and hoe blade 1520.

Hoe shaft 1515 may be an example of, or include aspects of, the corresponding element or elements described with reference to FIGS. 6-14, and 20. Hoe blade 1520 may be an example of, or include aspects of, the corresponding element or elements described with reference to FIGS. 6-14, 19, and 20. Soil 1525 may be an example of, or include aspects of, the corresponding element or elements described with reference to FIG. 18.

Figure 16:
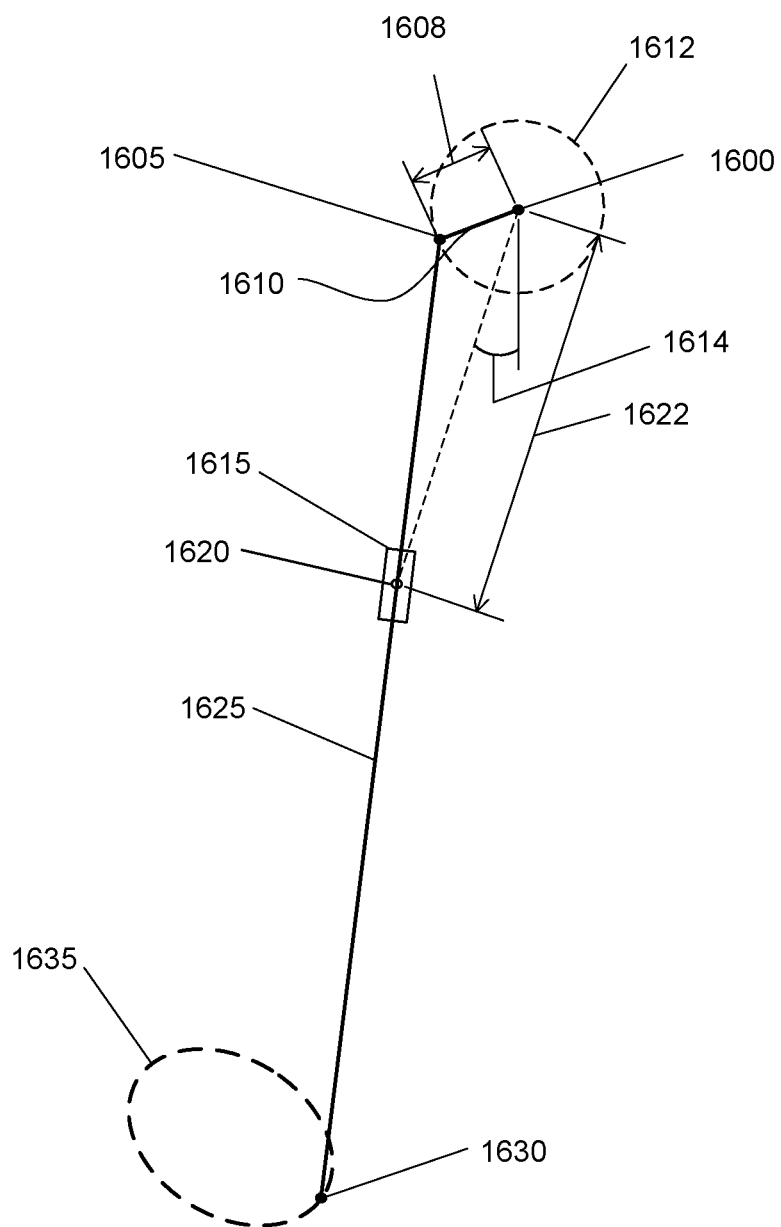
FIGS. 16 through 17 show examples of an exemplary elliptical motion geometry according to aspects of the present disclosure.

FIG. 16 shows an example of an exemplary elliptical motion geometry according to aspects of the present disclosure. The example shown includes motor shaft pivot point 1600, first arm pivot point 1605, first arm center line 1610, hoe shaft guide 1615, hoe shaft guide pivot point 1620, hoe shaft center line 1625, hoe shaft end 1630, and elliptical path 1635.

Figure 17:
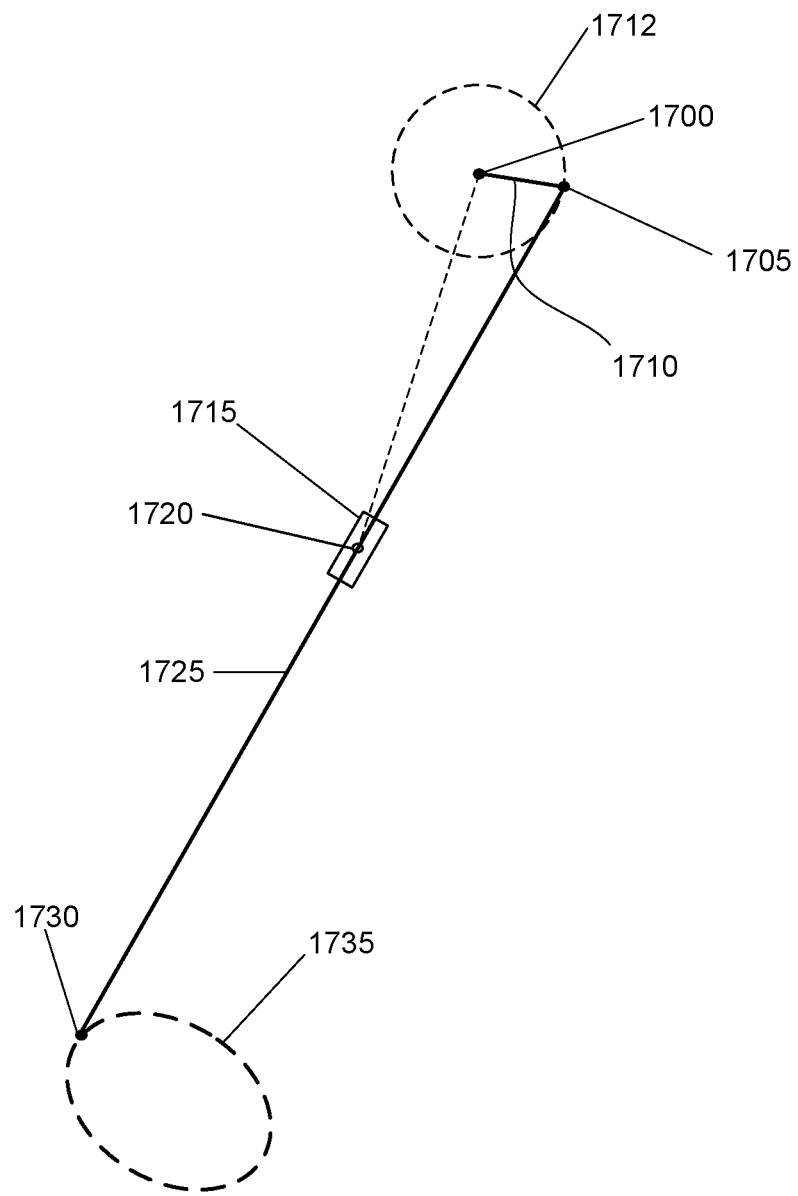

Referring to FIGS. 16 and 17, a diagram for an exemplary elliptical motion geometry is shown in one embodiment of the present invention. FIG. 16 illustrates a first position of the hoe shaft centerline during the elliptical motion, and FIG. 17 illustrates a second position of the hoe shaft centerline during the elliptical motion. As shown in FIG. 16, the first arm pivots about the motor shaft pivot point 1600, which is a fixed point. The first arm also has a first arm pivot point 1605, which is located at a first arm pivot distance 1608 from the motor shaft pivot point 1600. In the present embodiment, the first arm pivot distance 1608 is approximately 1.5 inches. Due to the rotation of the motor shaft, the first arm is rotated about the motor shaft pivot point 1600, such that the first arm pivot point 1605 follows the circular path 1612 with the radius equal to the first arm pivot distance 1608 (therefore having, in the present embodiment, a radius equal to 1.5 inches).

The hoe shaft is coupled to the first arm at the first arm pivot point 1605. The movement of the hoe shaft is further governed by the sliding connection to the hoe shaft guide 1615. The hoe shaft guide 1615 pivots about the hoe shaft guide pivot point 1620. The hoe shaft itself is not directly connected to the hoe shaft pivot point 1620, but because the hoe shaft passes through the hoe shaft guide 1615, but is not otherwise constrained by the hoe shaft guide 1615, the hoe shaft centerline 1625 is always aligned with the hoe shaft guide pivot point 1620, while the hoe shaft is still free to slide within the hoe shaft guide 1615 as the first arm pivot point 1605 moves around the circular path 1612.

The elliptical motion is further determined by the location of the motor shaft pivot point 1600 relative to the hoe shaft guide pivot point 1620. In the present embodiment, the distance 1622 between the motor shaft pivot point 1600 and the hoe shaft guide pivot point 1620 is approximately 5 inches. In the present embodiment the angle 1614 between the motor shaft pivot point 1600 and the hoe shaft guide pivot point 1620 is approximately 17 degrees.

In the present embodiment, a length from the first arm pivot point 1605 to the hoe shaft end 1630 (wherein the motion of the end of the hoe shaft is along the elliptical path 1635) is approximately 17 inches. It will be understood by those of ordinary skill in the art that alternative geometrical configurations and distances/angles are contemplated. The geometrical layout and distances/angles shown are one embodiment of a suitable geometrical arrangement resulting in an elliptical path 1635, but any suitable arrangement may be used.

Motor shaft pivot point 1600, first arm pivot point 1605, and first arm center line 1610 may be examples of, or include aspects of, the corresponding element or elements described with reference to FIG. 17. Hoe shaft guide 1615 may be an example of, or include aspects of, the corresponding element or elements described with reference to FIGS. 7, 8, and 17.

Hoe shaft guide pivot point 1620, hoe shaft center line 1625, and hoe shaft end 1630 may be examples of, or include aspects of, the corresponding element or elements described with reference to FIG. 17. Elliptical path 1635 may be an example of, or include aspects of, the corresponding element or elements described with reference to FIGS. 17-19. Circular path 1612 may be an example of, or include aspects of, the corresponding element described with reference to FIG. 17.

FIG. 17 shows an example of an exemplary elliptical motion geometry according to aspects of the present disclosure. The example shown includes motor shaft pivot point 1700, first arm pivot point 1705, first arm center line 1710, hoe shaft guide 1715, hoe shaft guide pivot point 1720, hoe shaft center line 1725, hoe shaft end 1730, and elliptical path 1735.

Motor shaft pivot point 1700, first arm pivot point 1705 and first arm center line 1710 may be examples of, or include aspects of, the corresponding element or elements described with reference to FIG. 16. Hoe shaft guide 1715 may be an example of, or include aspects of, the corresponding element or elements described with reference to FIGS. 7, 8, and 16.

Hoe shaft guide pivot point 1720, hoe shaft center line 1725 and hoe shaft end 1730 may be examples of, or include aspects of, the corresponding element or elements described with reference to FIG. 16. Elliptical path 1735 may be an example of, or include aspects of, the corresponding element or elements described with reference to FIGS. 16, 18, and 19. Circular path 1712 may be an example of, or include aspects of, the corresponding element described with reference to FIG. 16.

Figure 18:
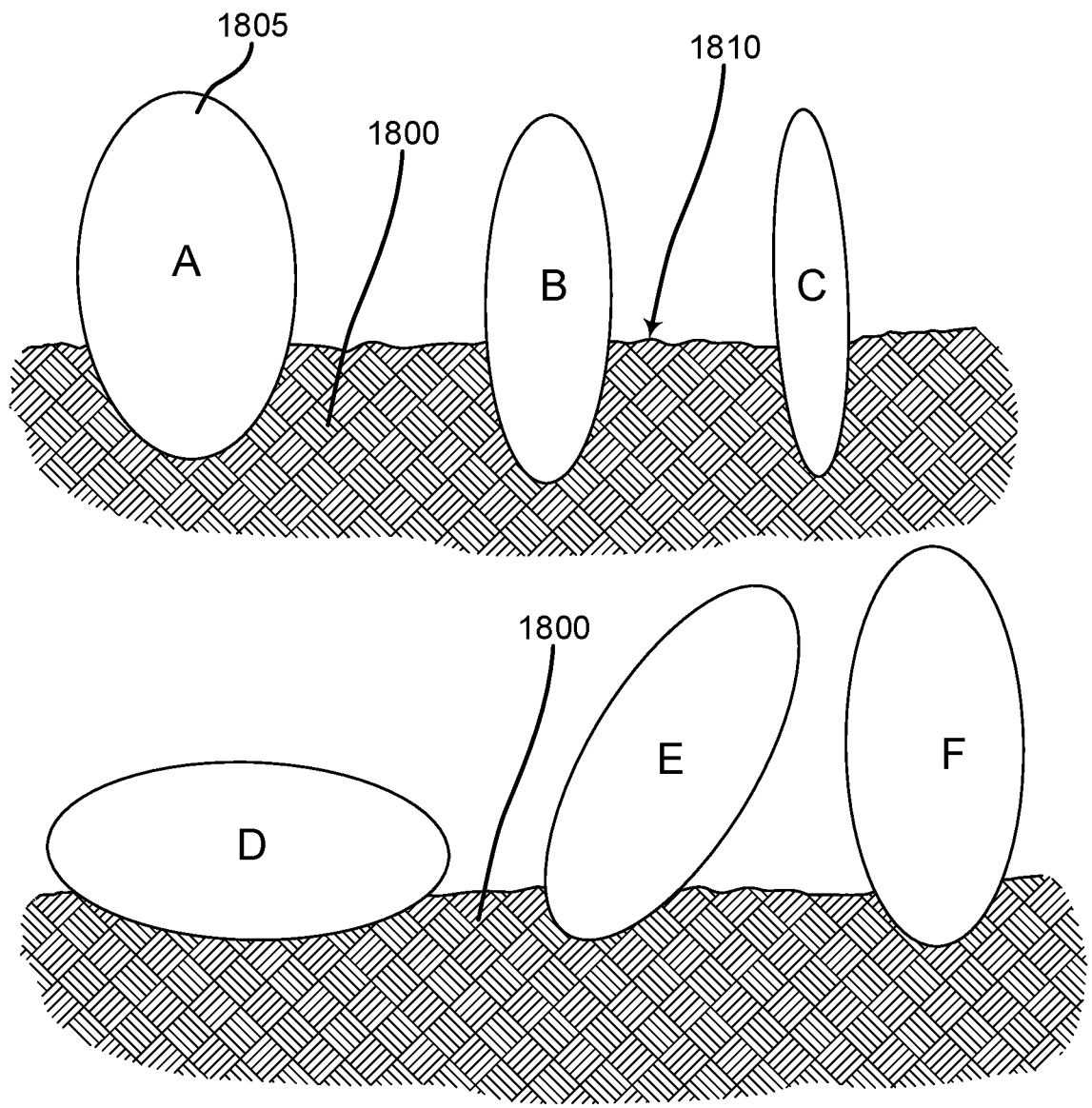
FIG. 18 shows an example of exemplary elliptical motion geometries with respect to a field surface according to aspects of the present disclosure.

FIG. 18 shows an example of exemplary elliptical motion geometries with respect to a field surface 1800 according to aspects of the present disclosure. The example shown includes soil 1800, elliptical paths 1805, and field surface 1810.

FIG. 18 shows examples of various elliptical paths 1805 including paths A through E. The width, angle, height, and distance with respect to the ground level of the elliptical path 1805 may be modified depending on the depth of soil penetration desired, the width of soil penetration required, the desired angle of the blade relative to the field surface 1810, and the desired length of time that the blade is in the soil 1800. In elliptical path A of FIG. 18, the elliptical path 1805 is wider, whereby the width of soil 1800 traveled by the hoe blade is also wider.

Elliptical path B is narrower, and the width of soil 1800 traveled by the hoe blade is narrower. The angle at which the elliptical path 1805 crosses the ground surface 1810 is also different for elliptical paths A and B.

In elliptical path C, the elliptical path 1805 is narrower than elliptical path B. The width of soil 1800 affected for elliptical path C is much narrower than elliptical path A, and the elliptical path 1805 is in an almost vertical orientation proximate to the ground surface (field surface) 1810 for both locations (i.e. entry and exit) where the elliptical path 1805 crosses the ground surface 1810.

While elliptical paths A, B, and C are oriented in the generally vertical direction (i.e. ellipse major axis oriented close to vertical), path D is oriented horizontally (i.e. ellipse major axis close to horizontal). In path D, the elliptical path 1805 is shallower and wider than for vertically-oriented elliptical paths A, B and C. The elliptical path 1805 would intersect the ground surface 1810 at a shallower angle than compared to paths A, B, and C and the hoe blade would remain in the soil 1800 for a longer period of time.

Path E illustrates the elliptical path 1805 rotated at an angle from vertical. In this embodiment, the elliptical path angle for the hoe blade entering the soil 1800 and the angle for the blade exiting the soils are different. In the preferred embodiment, the angle of the hoe blade with respect to the hoe shaft (as described with respect to FIG. 6) is related to the angle of the elliptical path 1805 with respect to the ground surface 1810 at the entry intersection.

In path F, the elliptical path 1805 has been moved upwards with respect to the ground surface 1810 as compared to path A. By adjusting the path upwards or downwards with respect to the soil level, the depth of the hoe blade in the soil 1800 can be adjusted. In some embodiments, the elliptical path 1805 is oriented such that the hoe blade enters the soil 1800 in a manner that reduces or minimizes the initial surface contact area of the hoe blade with the field surface 1810 at the point of entry. In some embodiments the elliptical path 1805 is configured such that the hoe blade enters the soil 1800 in the generally tangential angle shown in FIG. 19 and the hoe blade surface area initially contacting the soil is reduced or minimized. This may allow the hoe blade to enter the soil 1800 more easily.

Field surface 1810 may be an example of, or include aspects of, the corresponding element or elements described with reference to FIGS. 9-15, and 19. Elliptical paths 1805 may be an example of, or include aspects of, the corresponding element or elements described with reference to FIGS. 16, 17, and 19. Soil 1800 may be an example of, or include aspects of, the corresponding element or elements described with reference to FIG. 15.

Figure 19:
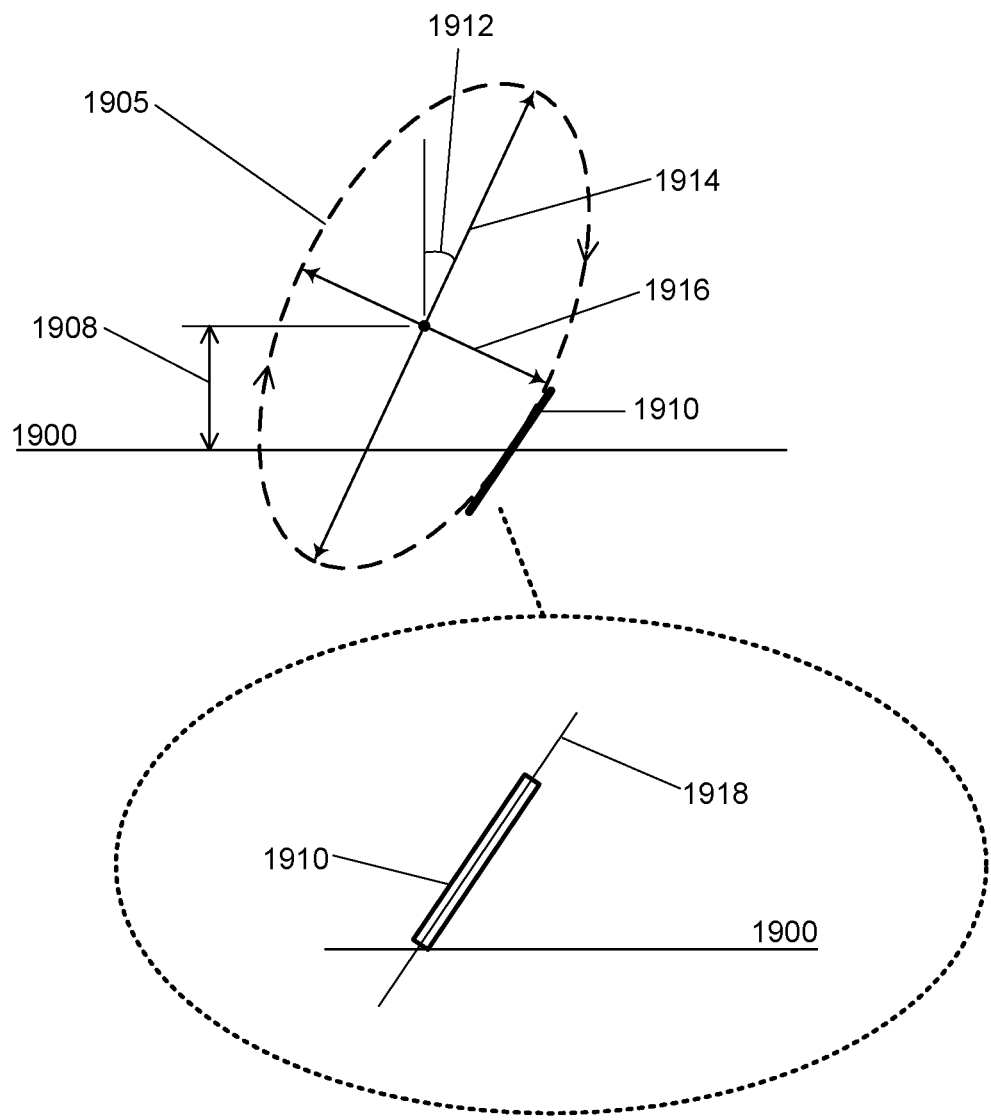
FIG. 19 shows an example of an elliptical path for a hoe blade according to aspects of the present disclosure.

FIG. 19 shows an example of an elliptical path 1905 for a hoe blade 1910 according to aspects of the present disclosure. The example shown includes field surface (ground surface) 1900, elliptical path 1905, and hoe blade 1910.

Referring to FIG. 19 an elliptical path diagram is shown. The elliptical path 1905 is determined by four parameters: the length of the major axis 1914, the length of the minor axis 1916, the angle 1912 of the upper portion of the major axis with respect to vertical, and the distance 1908 from the ellipse center to the field (ground) surface 1900. As described with respect to FIG. 17, these parameters are varied to obtain the desired path of the hoe blade 1910 through the soil.

Also shown is a tangent line 1918 that is tangent to the elliptical path 1905 at the intersection of the elliptical path 1905 and the ground surface 1900 at the entry location. In some embodiments, the elliptical motion mechanism is configured such that the angle of the hoe blade 1910 is aligned with the tangent line 1918 when the hoe blade 1910 enters the soil. The relationship of the hoe blade 1910 to the tangent line 1918 at entry is also illustrated. Aligning the hoe blade 1910 angle with the tangent line is advantageous as it decreases the force required for the hoe blade 1910 to enter the soil. Additionally, aligning the hoe blade 1910 with the tangent line 1918 ensures that upon initial contact with the ground only the lower blade edge of the hoe blade 1910 is in contact with the ground, whereby a greater force is applied to the soil due to the minimized contact area.

Varying the elliptical path 1905 parameters of the distance 1908 between the ellipse center and field surface, the length of the semi-minor axis 1916, the length of the semi-major axis 1914, and the angle 1912 with respect to vertical, and desired path through the soil can be obtained. If the desired path of the hoe blade 1910 is to enter the ground sharply and be in the ground for a short time, the distance 1908 between the ellipse center and the field surface 1900 would be greater and the elliptical path 1905 would be "tall and narrow", for example such as in path C of FIG. 18. For entering the ground for a longer time with the blade 1910 entering the surface at a shallower angle, the elliptical path 1905 can be "turned on its side" similar to path D of FIG. 18.

Field surface 1900 may be an example of, or include aspects of, the corresponding element or elements described with reference to FIGS. 9-15, and 18. Elliptical path 1905 may be an example of, or include aspects of, the corresponding element or elements described with reference to FIGS. 16-18. Hoe blade 1910 may be an example of, or include aspects of, the corresponding element or elements described with reference to FIGS. 6-15, and 20.

Figure 20:
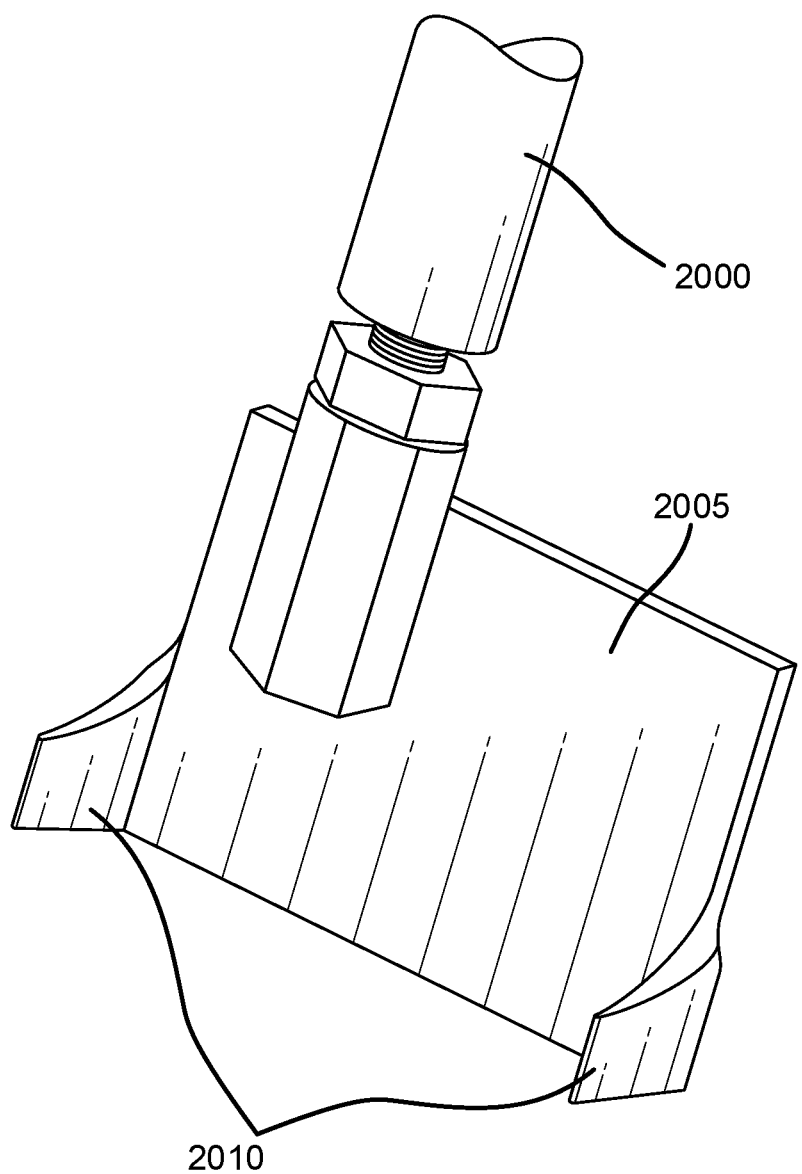
FIG. 20 shows an example of a hoe blade including chipper extensions according to aspects of the present disclosure.

FIG. 20 shows an example of a hoe blade 2005 including chipper extensions 2010 according to aspects of the present disclosure. The example shown includes hoe shaft 2000, hoe blade 2005, and chipper extension 2010.

In some embodiments the height of the chipper blade is between ½" and 1". In some embodiments, the height of the chipper extension 2010 blade is approximately ¾". In other embodiments, the extent of the chipper extension 2010 less than 20% of the hoe blade height. In other embodiments the chipper extension 2010 is less than 33% of hoe blade height. In yet another embodiment, the chipper extension 2010 is less than 50% of the hoe blade height. In yet another embodiment, the chipper extension is less than 100% of the hoe blade height. In some embodiments, the chipper extensions 2010 are the same height as the hoe blade 2005.

In the embodiment shown, a top edge of each chipper extension 2010 has a convex curve. In some embodiments, the lower edge of the chipper extension 2010 is approximately ⅛" lower than the hoe blade 2005 lower edge. The chipper extensions 2010 prevent soil from being pushed outside of the hoe blade 2005 extent when the hoe blade 2005 is moved in the elliptical motion. With only a straight blade, as the blade 2005 moves through the soil, soil is pushed laterally forward past the leading edge of the hoe blade 2005 and soil is pushed laterally rearwards past the rear edge of the hoe blade 2005.

As the soil is pushed laterally with respect to the hoe blade 2005 (i.e. forwards and rearwards with respect to the apparatus movement), adjacent plants may be adversely affected. Including the chipper extensions 2010 prevents the soil on either side of the hoe blade 2005 by being adversely affected by the hoe blade 2005 motion, i.e. the chipper extensions 2010 keep the sides of the soilless swath left by the hoe blade 2005 clean.

Hoe shaft 2000 may be an example of, or include aspects of, the corresponding element or elements described with reference to FIGS. 6-15. Hoe blade 2005 may be an example of, or include aspects of, the corresponding element or elements described with reference to FIGS. 6-15, and 19.

Figure 21:
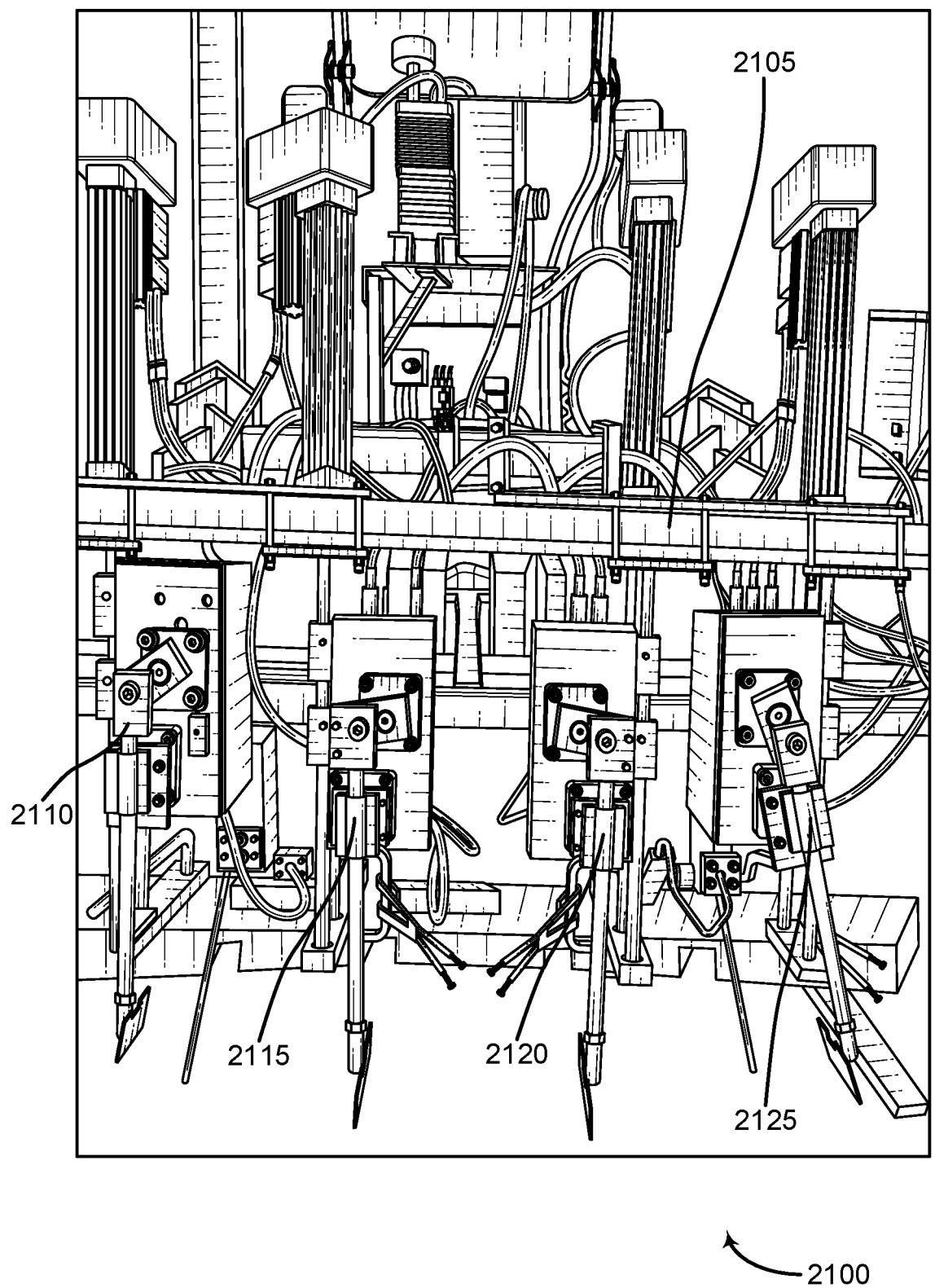
FIG. 21 shows an example of a soil disturbing apparatus including multiple hoe devices according to aspects of the present disclosure.

FIG. 21 shows an example of a soil disturbing apparatus 2100 including multiple hoe devices according to aspects of the present disclosure. Soil disturbing apparatus 2100 may include frame 2105, first hoe device 2110, second hoe device 2115, third hoe device 2120, and fourth hoe device 2125.

Frame 2105 may be an example of, or include aspects of, the corresponding element or elements described with reference to FIGS. 1, 5, and 9-15.

Referring to FIG. 21, another exemplary embodiment of a soil-disturbing/hoeing apparatus is shown. The apparatus of FIG. 21 includes four elliptical hoeing devices coupled to the frame 2105. The exemplary embodiment includes two left-hand hoe devices (i.e. the hoe blade sweeps to the left as viewed in FIG. 21), and two right-hand hoe devices (i.e. the hoe blade sweeps to the right as viewed in FIG. 21). In the present embodiment, the hoe devices are arranged as follows, from left to right: first left-hand hoe service (i.e., first hoe device 2110), second left-hand hoe device (i.e., second hoe device 2115), first right-hand hoe device (i.e., third hoe device 2120), and second right-hand hoe device (i.e., fourth hoe device 2125).

As shown in FIG. 21, multiple elliptical hoe devices may be coupled to the frame 2105, with each hoe device acting on a single row of seedlings or plants as the frame 2105 traverses the field. In the present embodiment, four rows of seedlings are acted on by the hoe apparatus of FIG. 21. In the present embodiment, the hoe devices are oriented such that the soil is swept outward from the centerline of the soil-disturbing/hoeing apparatus.

Referring again to FIGS. 1-21, the soil-disturbing/hoeing apparatus provides an improvement over human hoeing labor by providing an effective, consistent, and targeted hoeing movement. While investigating the effects of hoe blade path shape on energy efficiency and efficacy in removing a seedling at a particular location without disturbing other seedlings, an elliptical path was found to be an improvement over other path shapes, for example over a linear path shape or a circular path shape. The elliptical hoe blade path advantageously provides for a more energy-efficient hoe movement while properly performing the hoeing task.

In addition, the camera imaging and analysis in combination with the efficient hoeing mechanism allows for the apparatus to target specific plants or regions based on various criteria. Instead of the subjective analysis of a person when deciding which plants to thin, the soil-disturbing/hoeing apparatus consistently applies the criteria, which can be modified as necessary (with either operation input or using machine learning).

It will be understood by those of ordinary skill in the art that the elliptical path of the hoe blade may be implemented by any method, and any mechanical apparatus that operates the hoe blade along the desired elliptical path may be used.

Figure 22:
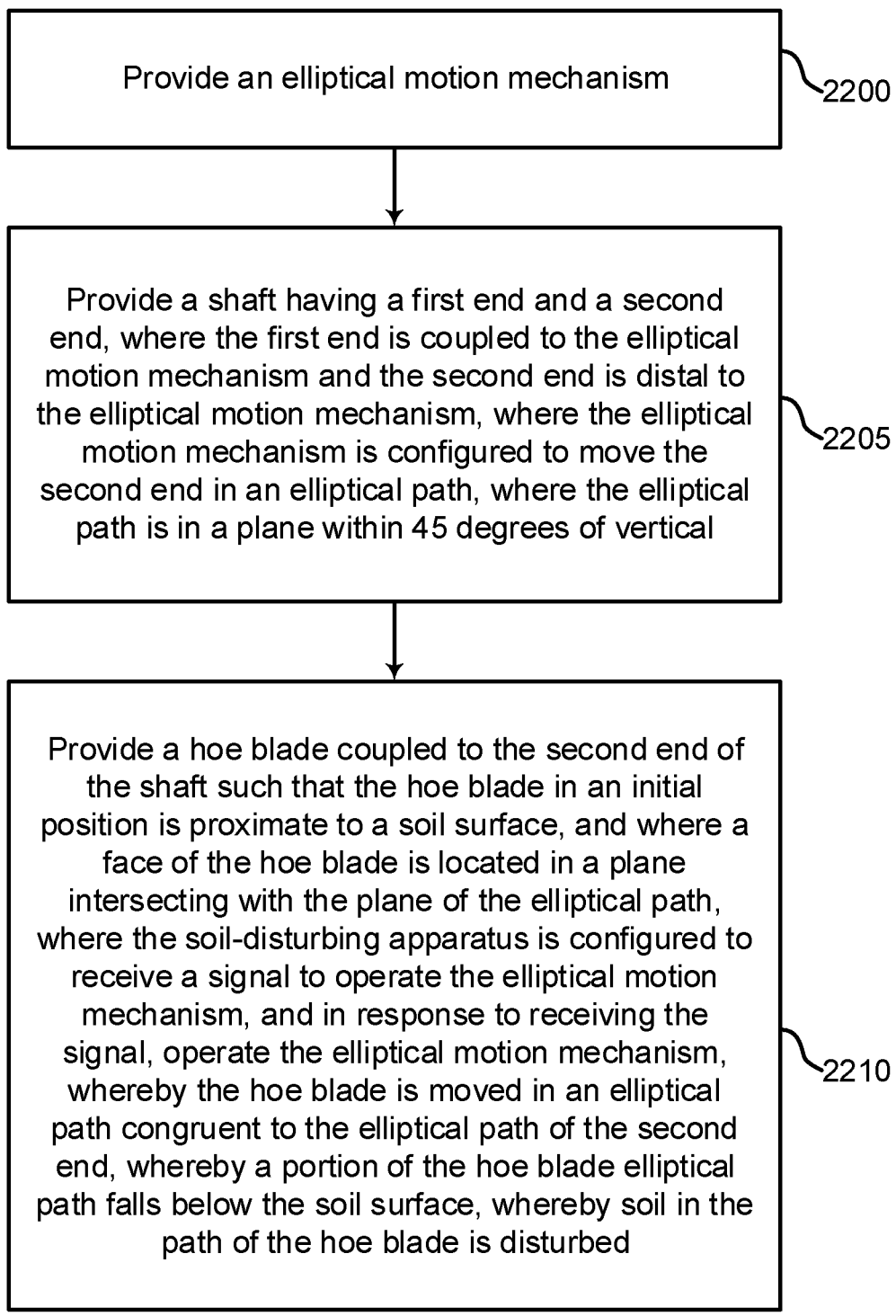
FIG. 22 shows an example of a process for manufacturing a soil disturbing apparatus according to aspects of the present disclosure.

FIG. 22 shows an example of a process for manufacturing a soil disturbing apparatus according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 2200, the manufacturing system provides an elliptical motion mechanism. In some cases, the operations of this step may refer to an elliptical motion mechanism as described with reference to FIGS. 1 and 5.

At operation 2205, the manufacturing system provides a shaft having a first end and a second end, where the first end is coupled to the elliptical motion mechanism and the second end is distal to the elliptical motion mechanism, where the elliptical motion mechanism is configured to move the second end in an elliptical path. In some cases, the operations of this step may refer to a hoe shaft as described with reference to FIGS. 6-15, 19, and 20.

At operation 2210, the manufacturing system provides a hoe blade coupled to the second end of the shaft such that the hoe blade in an initial position is proximate to a soil surface, and where a face of the hoe blade is located in a plane intersecting with the plane of the elliptical path, where the soil-disturbing apparatus is configured to: receive a signal to operate the elliptical motion mechanism; and in response to receiving the signal, operate the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed. In some cases, the operations of this step may refer to a hoe blade as described with reference to FIGS. 6-15, 19, and 20.

Figure 23:
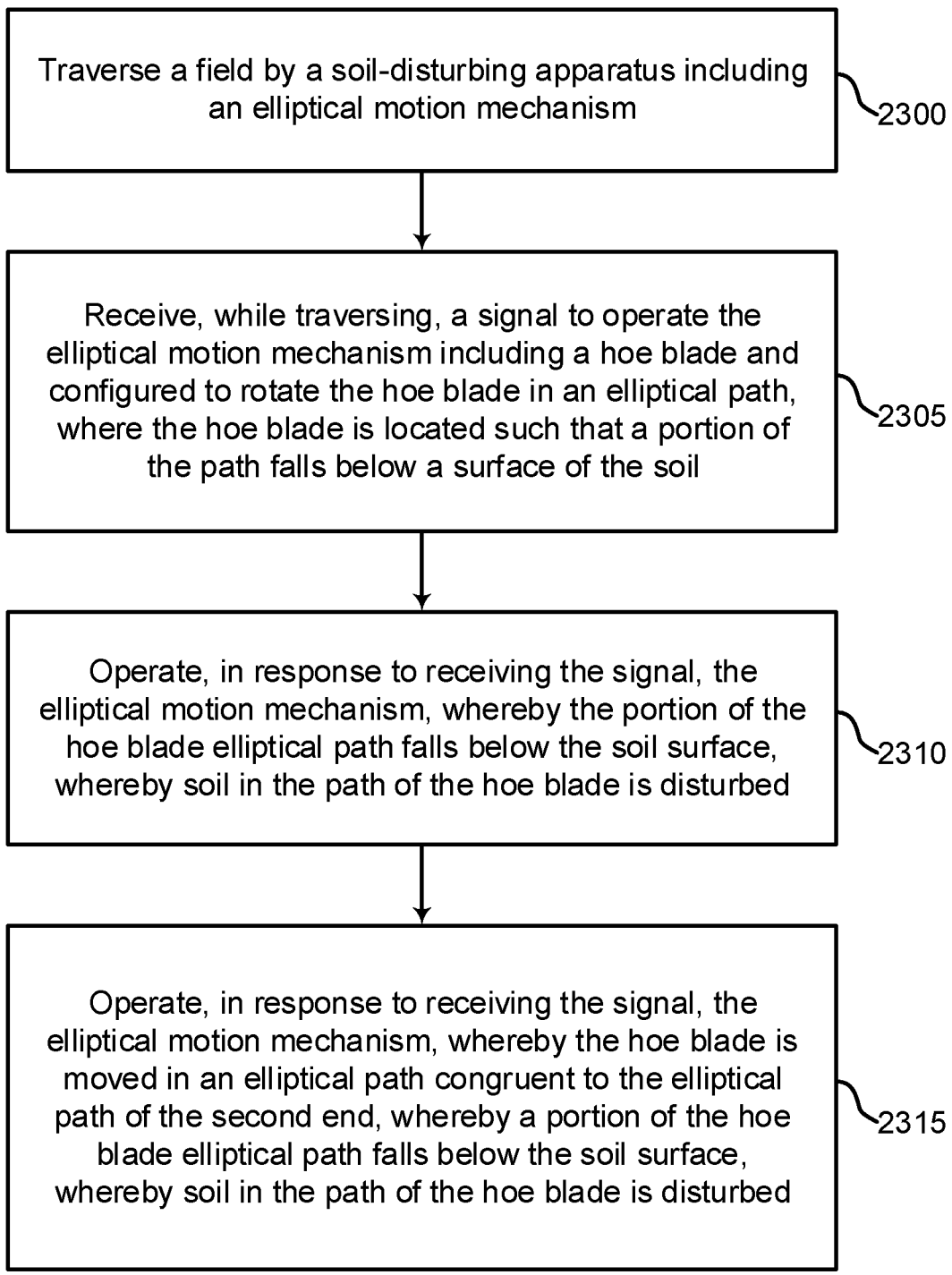
FIGS. 23 through 24 show examples of a soil disturbing process according to aspects of the present disclosure.

FIG. 23 shows an example of a soil disturbing process according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 2300, the system traverses a field by a soil-disturbing apparatus including an elliptical motion mechanism. In some cases, the operations of this step may refer to, or be performed by, a frame as described with reference to FIGS. 1, 5, 9-15, and 21.

At operation 2305, the system receives, while traversing, a signal to operate the elliptical motion mechanism including a hoe blade and configured to rotate the hoe blade in an elliptical path, where the hoe blade is located such that a portion of the path falls below a surface of the soil. In some cases, the operations of this step may refer to, or be performed by, an application as described with reference to FIG. 1.

At operation 2310, the system operates, in response to receiving the signal, the elliptical motion mechanism, whereby the portion of the hoe blade elliptical path falls below the soil surface, whereby soil in the path of the hoe blade is disturbed. In some cases, the operations of this step may refer to, or be performed by, an application as described with reference to FIG. 1.

At operation 2315, the system operates, in response to receiving the signal, the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed. In some cases, the operations of this step may refer to, or be performed by, an application as described with reference to FIG. 1.

Figure 24:
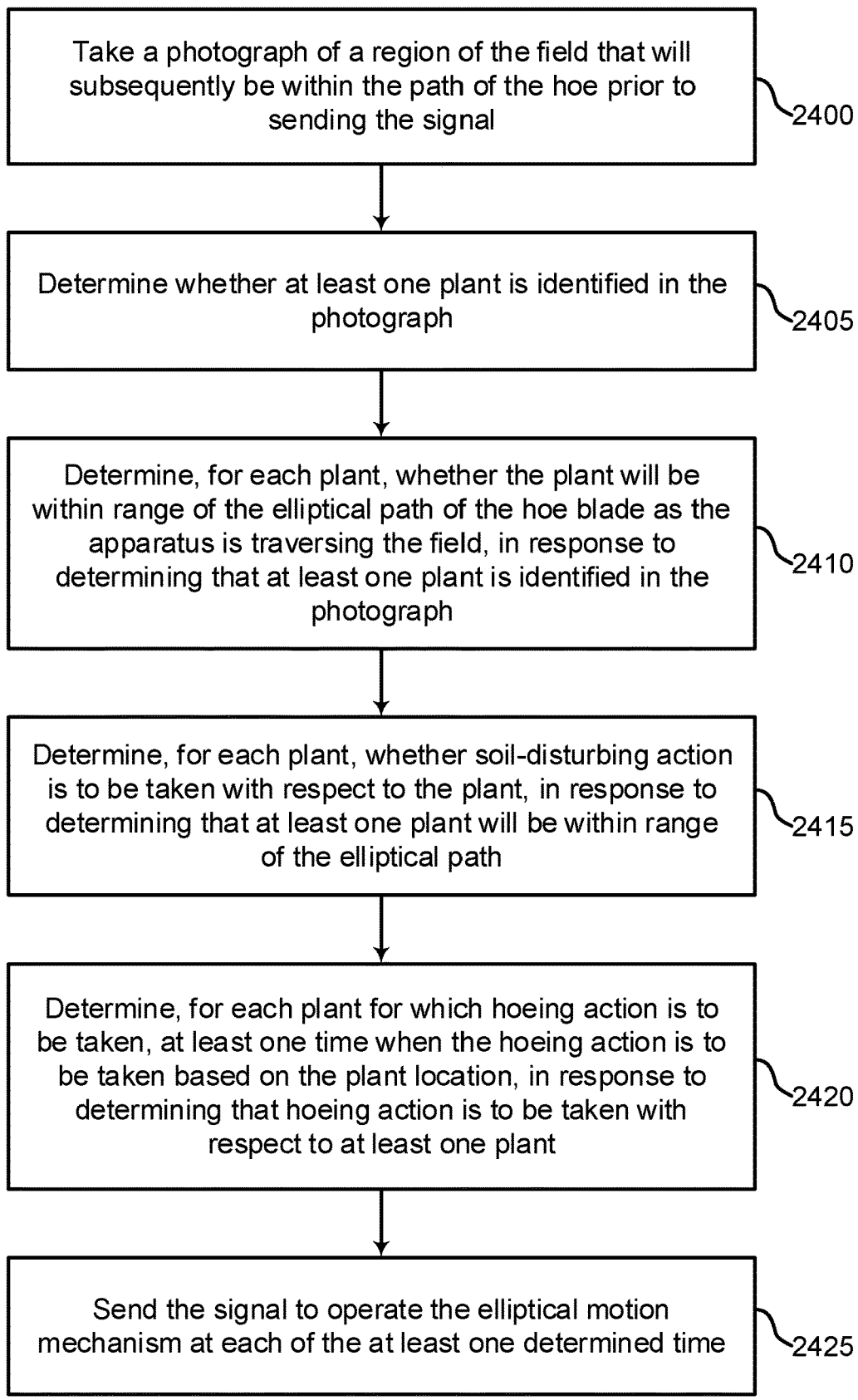

FIG. 24 shows an example of a soil disturbing process according to aspects of the present disclosure. In some examples, these operations may be performed by a system including a processor executing a set of codes to control functional elements of an apparatus.

Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 2400, the system takes a photograph of a region of the field that will subsequently be within the path of the hoe prior to sending the signal. In some cases, the operations of this step may refer to, or be performed by, a camera as described with reference to FIGS. 1 and 5.

At operation 2405, the system determines whether at least one plant is identified in the photograph. In some cases, the operations of this step may refer to, or be performed by, an application as described with reference to FIG. 1.

At operation 2410, the system determines, for each plant, whether the plant will be within range of the elliptical path of the hoe blade as the apparatus is traversing the field, in response to determining that at least one plant is identified in the photograph. In some cases, the operations of this step may refer to, or be performed by, an application as described with reference to FIG. 1.

At operation 2415, the system determines, for each plant, whether soil-disturbing action is to be taken with respect to the plant, in response to determining that at least one plant will be within range of the elliptical path. In some cases, the operations of this step may refer to, or be performed by, an application as described with reference to FIG. 1.

At operation 2420, the system determines, for each plant for which hoeing action is to be taken, at least one time when the hoeing action is to be taken based on the plant location, in response to determining that hoeing action is to be taken with respect to at least one plant. In some cases, the operations of this step may refer to, or be performed by, an application as described with reference to FIG. 1.

At operation 2425, the system sends the signal to operate the elliptical motion mechanism at each of the at least one determined time. In some cases, the operations of this step may refer to, or be performed by, an application as described with reference to FIG. 1.

Accordingly, the present disclosure includes the following embodiments.

An apparatus for soil disturbing is described. Embodiments of the apparatus may include an elliptical motion mechanism, a shaft having a first end and a second end, wherein the first end is coupled to the elliptical motion mechanism and the second end is distal to the elliptical motion mechanism, wherein the elliptical motion mechanism is configured to move the second end in an elliptical path, and a hoe blade coupled to the second end of the shaft such that the hoe blade in an initial position is proximate to a soil surface, and wherein a face of the hoe blade is located in a plane intersecting with the plane of the elliptical path, wherein the soil-disturbing apparatus is configured to: receive a signal to operate the elliptical motion mechanism; and in response to receiving the signal, operate the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed.

A method of manufacturing an apparatus for soil disturbing is described. The method may include providing an elliptical motion mechanism, providing a shaft having a first end and a second end, wherein the first end is coupled to the elliptical motion mechanism and the second end is distal to the elliptical motion mechanism, wherein the elliptical motion mechanism is configured to move the second end in an elliptical path, and providing a hoe blade coupled to the second end of the shaft such that the hoe blade in an initial position is proximate to a soil surface, and wherein a face of the hoe blade is located in a plane intersecting with the plane of the elliptical path, wherein the soil-disturbing apparatus is configured to: receive a signal to operate the elliptical motion mechanism; and in response to receiving the signal, operate the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed.

In some examples, the second end elliptical path is located in a plane within 5 degrees of vertical. In some examples, the hoe blade face is oriented such that at the time during the elliptical motion when the hoe blade enters the soil surface, the hoe blade face plane is tangential to the hoe blade elliptical path. In some examples, the apparatus is further configured to return the hoe blade to the initial position after disturbing the soil.

In some examples, the returning to the initial position is achieved by the elliptical motion mechanism moving the hoe blade through the complete elliptical path. In some examples, the angle between a semi-major axis of the elliptical path and vertical is less than 45 degrees. In some examples, the angle between a semi-minor axis of the elliptical path and vertical is less than 45 degrees.

In some examples, the hoe blade further comprises a chipper extension extending outward in a generally perpendicular direction from each side edge of the hoe blade, wherein each chipper extension extends in the direction of elliptical motion travel of the hoe blade. In some examples, the speed of the hoe blade while moved in the elliptical path is less than 300 rpm. In some examples, the hoe blade has a generally rectangular plate shape, wherein the plate is oriented in a plane generally perpendicular to the plane of the elliptical path.

Some examples of the apparatus and method described above may further include a frame coupled to the elliptical motion mechanism. In some examples, the frame is configured to traverse a field having the soil surface.

Some examples of the apparatus and method described above may further include a camera. Some examples may further include an application running on a computing device, wherein the application is in operatively coupled to the camera and the elliptical motion mechanism, wherein the soil-disturbing apparatus is further configured to traverse the field; while traversing the field, taking a photograph of a region of the field that will subsequently be within the path of the hoe; determine whether at least one plant is identified in the photograph; in response to determining that at least one plant is identified in the photograph, determine, for each plant, whether the plant will be within range of the elliptical path of the hoe blade as the apparatus traverses the field; in response to determining that at least one plant will be within range of the elliptical path, for each plant determine whether soil-disturbing action is to be taken with respect to the plant; in response to determining that hoeing action is to be taken with respect to at least one plant, for each plant for which hoeing action is to be taken, determine at least one time when the hoeing action is to be taken based at least in part on the plant location; and, at the at least one determined time, activate the elliptical motion mechanism.

In some examples, the soil-disturbing action comprises activating the elliptical motion mechanism when a leading edge of the hoe blade is adjacent to the plant, and activating the elliptical motion mechanism again when a trailing edge of the hoe blade has passed the location of the plant, whereby the soil before and after the plant is cleared.

In some examples, the soil-disturbing action comprises activating the elliptical motion mechanism when the hoe blade is at the plant location, whereby the plant is removed from the soil by the action. In some examples, the determining whether soil-disturbing action is to be taken with respect to the plant further comprises determining viability of the plant.

Some examples of the apparatus and method described above may further include a location sensor coupled to the frame and configured to send location data to the application. Some examples of the apparatus and method described above may further include a light-shielding box coupled to the frame, wherein the camera is located within the light-shielding box, wherein the light-shielding box is configured to shield the camera lens from excess light that would prevent plants from being identified in the photographs.

Some examples of the apparatus and method described above may further include an actuator coupled to the frame, wherein the housing is coupled to the actuator, wherein in the actuator is configured to move the housing up and down with respect to the frame. Some examples of the apparatus and method described above may further include a ground sensor configured to continually determine an elevation of the soil surface communicatively coupled to the actuator, wherein the actuator moves the housing with respect to the frame in response to the determined elevation.

A method for soil disturbing is described. Embodiments of the method may include traversing a field by a soil-disturbing apparatus including an elliptical motion mechanism, receiving, while traversing, a signal to operate the elliptical motion mechanism including a hoe blade and configured to rotate the hoe blade in an elliptical path, wherein the hoe blade is located such that a portion of the path falls below a surface of the soil, operating, in response to receiving the signal, the elliptical motion mechanism, whereby the portion of the hoe blade elliptical path falls below the soil surface, whereby soil in the path of the hoe blade is disturbed, and operating, in response to receiving the signal, the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed.

Some examples of the method described above may further include taking a photograph of a region of the field that will subsequently be within the path of the hoe prior to sending the signal. Some examples may further include determining whether at least one plant is identified in the photograph. Some examples may further include determining, for each plant, whether the plant will be within range of the elliptical path of the hoe blade as the apparatus is traversing the field, in response to determining that at least one plant is identified in the photograph.

Some examples may further include determining, for each plant, whether soil-disturbing action is to be taken with respect to the plant, in response to determining that at least one plant will be within range of the elliptical path. Some examples may further include determining, for each plant for which hoeing action is to be taken, at least one time when the hoeing action is to be taken based at least in part on the plant location, in response to determining that hoeing action is to be taken with respect to at least one plant. Some examples may further include sending the signal to operate the elliptical motion mechanism at each of the at least one determined time.

In some examples, the determining whether soil-disturbing action is to be taken with respect to the plant includes determining whether the plant is wanted. In some examples, the determining whether soil-disturbing action is to be taken with respect to the plant includes determining whether the plant is viable. Some examples of the method described above may further include returning a programming flag value (e.g. a zero value) when no plants are identified in the photograph. Some examples may further include repeating the step of taking a photograph of a region of the field.

In some examples, the hoeing action is configured to disturb soil before and after each plant while leaving that plant undisturbed. In some examples, the hoeing action is configured to disturb the soil where each plant is rooted, thereby removing each plant from the field.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A soil-disturbing apparatus comprising:
   a frame configured to traverse a field having a soil surface;
   an elliptical motion mechanism coupled to the frame;
   a shaft having a first end and a second end, wherein the first end is coupled to the elliptical motion mechanism and the second end is distal to the elliptical motion mechanism, wherein the elliptical motion mechanism is configured to move the second end in an elliptical path; and
   a hoe blade coupled to the second end of the shaft such that the hoe blade in an initial position is proximate to the soil surface, wherein a face of the hoe blade is located in a plane intersecting with the plane of the elliptical path;

a camera and an application running on a computing device, wherein the application is operatively coupled to the camera and the elliptical motion mechanism, and wherein the soil-disturbing apparatus is configured to:

traverse the field;

while traversing the field, take a photograph of a region of the field that will subsequently be within the path of the hoe;

determine whether at least one plant is identified in the photograph;

in response to determining that at least one plant is identified in the photograph, determine, for each plant, whether the plant will be within range of the elliptical path of the hoe blade as the apparatus traverses the field;

in response to determining that at least one plant will be within range of the elliptical path, for each plant determine whether soil-disturbing action is to be taken with respect to the plant;

in response to determining that soil-disturbing action is to be taken with respect to at least one plant, for each plant for which soil-disturbing action is to be taken, determine at least one time when the soil-disturbing action is to be taken based at least in part on the plant location;

at the at least one determined time, send a signal to operate the elliptical motion mechanism; and in response to sending the signal, operate the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed.

2. The soil-disturbing apparatus of claim 1, wherein the hoe blade face is oriented such that at the time during the elliptical motion when the hoe blade enters the soil surface, the hoe blade face plane is tangential to the hoe blade elliptical path.

3. The soil-disturbing apparatus of claim 1, wherein the soil-disturbing apparatus is further configured to return the hoe blade to the initial position after disturbing the soil.

4. The soil-disturbing apparatus of claim 1, wherein the hoe blade has a generally rectangular plate shape, wherein the plate is oriented in a plane generally perpendicular to the plane of the elliptical path.

5. The soil-disturbing apparatus of claim 1, wherein the soil-disturbing action comprises activating the elliptical motion mechanism when a leading edge of the hoe blade is adjacent to the plant, and activating the elliptical motion mechanism again when a trailing edge of the hoe blade has passed the location of the plant, whereby the soil before and after the plant is cleared.

6. The soil-disturbing apparatus of claim 1, wherein the soil-disturbing action comprises activating the elliptical motion mechanism when the hoe blade is at the plant location, whereby the plant is removed from the soil by the soil-disturbing action.

7. The soil-disturbing apparatus of claim 1, wherein determining whether soil-disturbing action is to be taken with respect to the plant further comprises determining viability of the plant.

8. The soil-disturbing apparatus of claim 1, further comprising a location sensor coupled to the frame and configured to send location data to the application.

9. The soil-disturbing apparatus of claim 1, further comprising a light-shielding box coupled to the frame, wherein the camera is located within the light-shielding box, wherein the light-shielding box is configured to shield the camera lens from excess light that would prevent plants from being identified in the photographs.

10. The soil-disturbing apparatus of claim 1, further comprising:

an actuator coupled to the frame; and a housing is coupled to the actuator and to the elliptical motion mechanism, wherein in the actuator is configured to move the housing up and down with respect to the frame.

11. The soil-disturbing apparatus of claim 10, further comprising a ground sensor configured to continually determine an elevation of the soil surface communicatively coupled to the actuator, wherein the actuator moves the housing with respect to the frame in response to the determined elevation.

12. A method for disturbing soil in a field, comprising:

traversing of a field by a soil-disturbing apparatus including an elliptical motion mechanism including a hoe blade and configured to rotate the hoe blade in an elliptical path, wherein the hoe blade is located such that a portion of the path falls below a surface of the soil;

taking a photograph of a region of the field that will subsequently be within the path of the hoe blade;

determining whether at least one plant is identified in the photograph;

in response to determining that at least one plant is identified in the photograph, determining, for each plant, whether the plant will be within range of the elliptical path of the hoe blade as the apparatus is traversing the field;

in response to determining that at least one plant will be within range of the elliptical path, for each plant determining whether soil-disturbing action is to be taken with respect to the plant;

in response to determining that soil-disturbing action is to be taken with respect to at least one plant, for each plant for which soil-disturbing action is to be taken, determining at least one time when the soil-disturbing action is to be taken based at least in part on the plant location; and at each of the at least one determined time, sending a signal to operate the elliptical motion mechanism; and in response to sending the signal, operating the elliptical motion mechanism, whereby the hoe blade is moved in an elliptical path congruent to the elliptical path of the second end, whereby a portion of the hoe blade elliptical path falls below the soil surface, whereby soil in the path of the hoe blade is disturbed.

13. The method for disturbing soil in the field of claim 12, wherein the determining whether soil-disturbing action is to be taken with respect to the plant includes determining whether the plant is wanted.

14. The method for disturbing soil in the field of claim 12, further comprising the steps of:

when no plants are identified in the photograph, returning a programming flag value;

repeating the step of taking a photograph of a region of the field.

15. The method for disturbing soil in the field of claim 12, wherein the soil-disturbing action is configured to disturb soil before and after each plant while leaving that plant undisturbed.

16. The method for disturbing soil in the field of claim 12, wherein the soil-disturbing action is configured to disturb the soil where each plant is rooted, thereby removing each plant from the field.

* * * * *